United States Patent
Hayek

(10) Patent No.: US 11,629,228 B2
(45) Date of Patent: Apr. 18, 2023

(54) COMPOSITIONS OF AND METHODS FOR PRODUCING MODIFIED MONOMERS AND POLYIMIDES FOR SOUR MIXED GAS SEPARATION

(71) Applicant: Saudi Arabian Oil Company, Dhahran (SA)

(72) Inventor: Ali Hayek, Dhahran (SA)

(73) Assignee: SAUDI ARABIAN OIL COMPANY

( * ) Notice: Subject to any disclaimer, the term of this patent is extended or adjusted under 35 U.S.C. 154(b) by 374 days.

(21) Appl. No.: 16/837,257

(22) Filed: Apr. 1, 2020

(65) Prior Publication Data

US 2021/0309803 A1    Oct. 7, 2021

(51) Int. Cl.
| | | |
|---|---|---|
| *C08G 73/10* | (2006.01) | |
| *B01D 67/00* | (2006.01) | |
| *B01D 71/64* | (2006.01) | |
| *C08J 11/28* | (2006.01) | |
| *C10L 3/10* | (2006.01) | |

(52) U.S. Cl.
CPC ...... *C08G 73/1028* (2013.01); *B01D 67/0011* (2013.01); *B01D 71/64* (2013.01); *C08J 11/28* (2013.01); *B01D 2256/245* (2013.01); *B01D 2257/304* (2013.01); *C08J 2379/08* (2013.01); *C10L 3/103* (2013.01)

(58) Field of Classification Search
None
See application file for complete search history.

(56) References Cited

U.S. PATENT DOCUMENTS

| | | |
|---|---|---|
| 2,560,164 A | 7/1951 | Garber |
| 3,919,182 A | 11/1975 | Gaylord |
| 4,596,860 A | 6/1986 | Percec et al. |
| | (Continued) | |

FOREIGN PATENT DOCUMENTS

WO   2014047423 A1   3/2014

OTHER PUBLICATIONS

Kim, Yun-Hi et al., "Synthesis and Characterization of Highly Soluble and Oxygen Permeable New Polyimides Based on Twisted Biphenyl Dianhydride and Spirofluorene Diamine", Macromolecules, 2005, 38, pp. 7950-7956. (Year: 2005).*

(Continued)

*Primary Examiner* — Jason M Greene
(74) *Attorney, Agent, or Firm* — Bracewell LLP; Constance Gall Rhebergen

(57) ABSTRACT

Compositions of and methods for producing a modified polyimide-containing compound with an alkyl or acyl group, one method including selecting and preparing a polyimide-containing compound to undergo a Friedel-Crafts alkylation or acylation reaction; carrying out the Friedel-Crafts alkylation or acylation reaction on the polyimide-containing compound to bond an alkyl group or acyl group to a reactive site on an aromatic compound of the polyimide-containing compound; cleaving the polyimide-containing compound to produce modified monomers comprising the alkyl group or the acyl group; and using the modified monomers in a reaction to produce the modified polyimide-containing compound, wherein the alkyl group or the acyl group is present in the modified polyimide-containing compound.

23 Claims, 13 Drawing Sheets

⟨Ar₁⟩ ⟨Ar₂⟩ : AROMATIC RINGS
R-X: ALKYL HALIDE OR ACYL HALIDE

(56) References Cited

U.S. PATENT DOCUMENTS

| | | |
|---|---|---|
| 4,673,717 A | 6/1987 | Percec et al. |
| 4,684,376 A | 8/1987 | Percec et al. |
| 6,531,569 B1 | 3/2003 | Tachiki et al. |
| 2002/0150697 A1 | 10/2002 | Swager et al. |
| 2015/0000522 A1 | 1/2015 | Ahn et al. |
| 2018/0345229 A1* | 12/2018 | Yahaya ............ B01D 71/64 |

OTHER PUBLICATIONS

Decarli, Nicolas Oliveira et al., "Preparation and characterization of acylated polyetherimide", Materials Chemistry and Physics, 220, 2018, pp. 149-154. (Year: 2018).*

International Search Report and Written Opinion of PCT Application No. PCT/US2021/025088 dated Jul. 2, 2021: pp. 1-15.

Hayek et al., "Effect of pendent bulky groups on pure- and sour mixed-gas permeation properties of triphenylamine-based polyimides," Seperation and Purification Technology, vol. 227, Jun. 18, 2019: pp. 1-11.

Kim et al., "Synthesis and characterization of highly soluble and oxygen permeable new polyimides based on twisted biphenyl dianhydride and spirobifluorene diamine," Macromolecules, vol. 38(19), Sep. 1, 2005: pp. 7950-7956.

Decarli et al., "Preparation and characterization of acylated polyetherimide", Materials Chemistry and Physics (2018).

M. O. González-Díaz et al., "Novel copolyaramides with bulky flexible groups for pure and mixed-gas separation", Separation and Purification Technology 189 (2017) 366-374.

Murgasova et al., "Characterization of Polyimides by Combining Mass Spectrometry and Selective Chemical Reaction", Macromolecules (2004).

U.S. Appl. No. 16/287,467, "Aromatic Co-Polyimide Gas Separation Membranes Derived From 6FDA-6FpDA-Type Homo-Polyimides", filed Feb. 27, 2020.

U.S. Appl. No. 16/287,474, "Aromatic Co-Polyimide Gas Separation Membranes Derived From 6FDA-DAM-Type Homo-Polyimides", filed Feb. 27, 2020.

U.S. Appl. No. 16/825,523, "Multi-Layer Composite Gas Separation Membranes, Methods for Preparation, and Use", filed Mar. 20, 2020.

* cited by examiner

COMPOSITIONS OF AND METHODS FOR PRODUCING MODIFIED MONOMERS AND POLYIMIDES FOR SOUR MIXED GAS SEPARATION

BACKGROUND

Field

Embodiments of the disclosure relate to membranes and separations for hydrocarbons. In particular, embodiments of the disclosure show copolyimide membranes for sour gas separations relating to natural gas.

Description of the Related Art

In recent years, certain interest in clean energy has increased, and world-wide demand for clean-burning natural gas is also rising. Natural gas consumption is likely to grow at a compounded annual growth rate of about 2.7% from about 2,600 Billion Cubic Meters (BCM) in 2005 to around 3,900 BCM in 2020. Based on 2006 estimates, natural gas has a reserve-to-production ratio of 61 years and a resource-to-production ratio of 133 years.

Raw natural gas varies greatly in composition depending on its extraction origin. Although methane constitutes the key component of raw natural gas, it may also contain considerable amounts of impurities including water, hydrogen sulfide ($H_2S$), carbon dioxide, nitrogen and other hydrocarbons. Natural gas (methane) is a main feedstock for the chemical industry, and with the potential growth in demand for natural gas, separation technologies with high efficiency are required in order to be able to exploit gas fields which are not yet commercially viable because of high contaminant contents.

One step in natural gas treatment involves the removal of acid gases before the gas is delivered to pipelines or stored in portable cylinders as compressed natural gas. At high concentrations, acid gases can corrode transportation pipelines and exhibit numerous other detrimental effects. Moreover, $H_2S$ is toxic and its combustion produces harmful $SO_2$ gas. Thus, sweetening of natural gas (removal of contaminants, such as for example $H_2S$) is needed to reduce pipeline corrosion, prevent atmospheric pollution, increase fuel heating value of natural gas, and decrease the volume of gas to be transported in pipelines and cylinders.

Presently, natural gas treatment and upgrading incorporates industrial gas separation processes. Examples of natural gas treatment technology that have been widely applied include absorption and adsorption of acid gases, such as for example through amine absorption processes and pressure swing adsorption (PSA), respectively. However, conventional technologies are associated with several problems, which include high energy requirements and high capital costs.

The development of membrane materials for sour acid gas separations rarely has been studied. Studies that have been reported include studies on $H_2S/CH_4$ separation performance using rubbery polymeric membranes. However, since rubbery polymeric materials separate based on solubility selectivity, the $CO_2/CH_4$ separation capability of the rubbery polymeric membranes declines sharply and is much lower than other glassy polymers such as cellulose acetate (CA). Furthermore, the mechanical stability of rubbery polymers tends to fall to significantly less than that of glassy polymeric materials. Polymeric membranes are of interest due, in part, to applications including: proton exchange membrane fuel cell application, cross-flow filtration, pervaporation, and gas separation. Morphology of a membrane can define its use and application. Chemical constitution of polymeric materials, from which the membrane is prepared, is one of the features which plays a role in membrane performance.

Glassy polyimide is one type of polymeric membrane that has been investigated for acid gas separations from natural gas. These high glass transition temperature (Tg) (Tg>about 300° C.) materials develop certain acid gas separation capability based on size selectivity. Natural gas is usually treated at high pressures (more than 900 psig) and typically saturated with heavy hydrocarbons ($C_{3+}$) and water vapor.

In order to enhance and optimize polyimide materials for gas separation membranes, further improvement of their properties is required, and this can be achieved by chemical modification of the polymers.

SUMMARY

Applicant has recognized that there is a need for efficient membrane separation compositions, apparatus, methods, and systems for selectively separating sour gas and unwanted components from sour natural gas feeds. The disclosure presents apparatus, methods, and systems applying membranes which show efficient, surprising, and unexpected separations of undesirable components from a sour natural gas feed. Unlike conventional technologies, membrane-based separations of the present disclosure do not exhibit drawbacks of conventional technology, as they are much more energy efficient, have less footprint, and are flexible in operation.

Therefore, disclosed are methods for producing a modified polyimide-containing compound with an alkyl or acyl group, for example a bulky alkyl or acyl group, one method comprising the steps of: selecting and preparing a polyimide-containing compound to undergo a Friedel-Crafts alkylation or acylation reaction; carrying out the Friedel-Crafts alkylation or acylation reaction on the polyimide-containing compound to bond an alkyl group or acyl group to a reactive site on an aromatic compound of the polyimide-containing compound; cleaving the polyimide-containing compound to produce modified monomers comprising the alkyl group or the acyl group; and using the modified monomers in a reaction to produce the modified polyimide-containing compound, wherein the alkyl group or the acyl group is present in the modified polyimide-containing compound.

Additionally disclosed is a membrane for separating the components of a sour natural gas feed, the membrane comprising: at least three distinct moieties polymerized together, the moieties including a first moiety comprising an alky or acyl group, for example a bulky group; a second moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA; and a third moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene;

MDA; TFMB; 4,4'-Diaminooctafluorobiphenyl; 4,4'-Diaminobiphenyl; 2,3,5,6-Tetrafluoro-1,4-phenylenediamine; and BTDA.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1A:
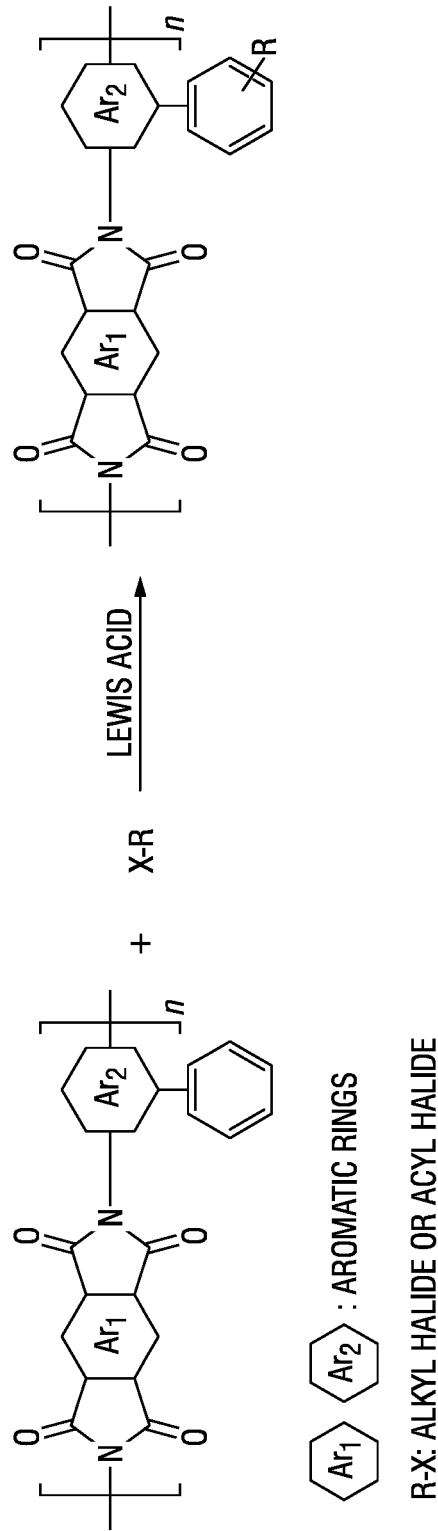
FIG. 1A shows a first scheme for a Friedel-Crafts alkylation or acylation reaction on a prepared polyimide.

So that the manner in which the features and advantages of the embodiments of compositions, methods for production, and methods for use of modified polyimide polymers for sour gas feed separations from natural gas, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Embodiments of the disclosure provide polyimide compositions, methods for production, and methods of use that improve sour mixed gas permeation properties of polyimide-based membranes. Embodiments surprisingly and unexpectedly improve sour mixed gas separation properties such as permeability of $H_2S$ and $CO_2$ through membranes without lessening the gas selectivity factors for $H_2S/CH_4$ and $CO_2/CH_4$ during gas separation.

Embodiments of polyimide polymers for modification by Friedel-Crafts alkylation or acylation (ultimately followed by cleavage to modified monomers, then recombination of said modified monomers to new polymers) of the present disclosure can include those monomers and copolyimides described, for example, in U.S. Pat. No. 9,962,646, U.S. Pub. No. 2018-0345229 A1, U.S. application Ser. No. 16/287,467, and U.S. application Ser. No. 16/287,474, the disclosures of which are all incorporated here by reference in their entirety.

Diamine monomers for producing copolyimides and copolyimides with modified monomers can include any suitable diamine derivative, for example aromatic diamines, linear aliphatic diamines, cyclic diamines, and saturated and unsaturated diamines containing sp$^3$, sp$^2$, in addition to or alternative to sp hybridized carbon atoms. Suitable dianhydride monomers can include any dianhydride derivative, for example aromatic dianhydrides, linear aliphatic dianhydrides, cyclic dianhydrides, and saturated and unsaturated dianhydrides that contain $sp^3$, $sp^2$, and/or sp hybridized carbon atoms.

Aromatic copolyimide membranes of the present disclosure can be synthesized from a wide range of monomers including and not limited to 4,4'-(hexafluoroisopropylidene) diphthalic dianhydride, also known as 2,2'-bis(3,4-dicarboxyphenyl)hexafluoropropane dianhydride (6FDA); 9,9-bis(4-aminophenyl) fluorene (CARDO); and 2,3,5,6-tetramethyl-1,4-phenylenediamine (durene diamine). The polymerization of the aforementioned monomers can form random polymers and block copolymers, for example with different block lengths and block ratios of (6FDA-durene)/(6FDA-CARDO) copolyimides. To enhance separation performance and optimize copolyimides for gas separation, chemical modifications including substitution of other pertinent moieties and bulky functional groups in the copolyimides backbone can be carried out.

Some embodiments of the present disclosure use monomers such as 1,3-phenylenediamine, also known as mPDA. As noted, some embodiments of the present disclosure use monomers such as 2,3,5,6-tetramethyl-1,4-phenylenediamine, also known as durene diamine. Such exemplary monomers are used in combination to form different block lengths of $(6FDA-mPDA)_l/(6FDA-durene)_m$ block copolyimides. In some embodiments of the present disclosure, blocks l and m can be between about 1,000 to 20,000 units. In addition, development of aromatic block copolyimides of the present disclosure can be carried out using other monomers including: 3,4,9,10-Perylenetetracarboxylic dianhydride, also known as PTCDA; Pyromellitic dianhydride, also known as PMDA; 1,4-bis(4-aminophenoxy)triptycene, also known as BAPT; 4,5,6,7-Tetrabromo-2-azabenzimidazole, also known as TBB; 4,4'-(9-Fluorenylidene)dianiline, also known as FDA; and 4,4'-Oxydiphthalic anhydride, also known as ODA.

Such example monomers can form example block units and block copolymers including for example: (6FDA-PTCDA-FDA); (6FDA-TBB-FDA); (6FDA-BAPT-FDA); (PTCDA-FDA)/(PMDA-mPDA); (PMDA-FDA)/(PTCDA-mPDA); (ODA-FDA)/(PTCDA-mPDA); (6FDA-BAPT)/(6FDA-FDA); (PTCDA-mPDA)/(6FDA-FDA); (PTCDA-FDA)/(ODA-mPDA); (PTCDA-FDA)/(6FDA-FDA); (6FDA-TBB)/(6FDA-FDA); (6FDA-TBB)/(6FDA-durene); (6FDA-mPDA)/(6FDA-BAPT); (PTCDA-mPDA)/(6FDA-FDA); (6FDA-mPDA-BAPT); and (6FDA-FDA-mPDA).

Unique modification steps significantly improve the performance of the copolyimides. In some other embodiments, the development of aromatic copolyimides can also be considered from other monomers with and without, or in the absence of, crosslinking. Example monomers include 4,4'-methylene-bis(2,6-diethylaniline) (MDEA); 9,9-bis(4-aminophenyl-3-isopropyl-5-methylphenyl) fluorene (alkyl substituted CARDO); 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; 2,3,5,6-Tetrafluoro-1,4-phenylenediamine; and combinations thereof. Those of ordinary skill in the art will realize additional monomers could be used in embodiments of the disclosure.

Examples include forming such copolymers as 6FDA-durene/CARDO (3:1) (millimoles durene:millimoles CARDO); 6FDA-durene/CARDO (1:1); 6FDA-durene/CARDO (1:3); block (6FDA-durene)/(6FDA-CARDO) (1,000-20,000)/(1,000-20,000); 6FDA-durene/alkyl substituted CARDO (3:1); 6FDA-durene/alkyl substituted CARDO (1:1); 6FDA-durene/alkyl substituted CARDO (1:3); block (6FDA-durene)/(6FDA-alkyl substituent CARDO) (1,000-20,000)/(1,000-20,000); 6FDA-durene/MDEA (3:1); 6FDA-durene/MDEA (1:1); 6FDA-durene/MDEA (1:3); block (6FDA-durene)/(6FDA-MDEA) (1,000-20,000)/(1,000-20,000); and combinations thereof.

Crosslinking of the polymers can be achieved using different types and sizing of functional groups. Examples include and are not limited to functionalization or grafting with polar or $H_2S$-philic, in addition to or alternative to $CO_2$-philic, groups that include Bromine (Br); sulfonic acid ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, 1,3-cyclohexane-bis(methylamine), and combinations thereof, for example.

In some embodiments, at least three distinct moieties are polymerized together, the moieties including a 2,2'-bis(3,4-dicarboxyphenyl)hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

Aromatic random and block copolyimide membranes of the present disclosure can be developed from a wide range of monomers including benzophenone-3,3', 4,4'-tetracarboxylic dianhydride (BTDA); 9,9-bis(4-aminophenyl)fluorene (CARDO); 4,4'-(hexafluoroisopropylidene)dianiline (6FpDA); 2,2'-bis(trifluoromethyl)benzidine (ABL-21); and 2,4,6-trimethyl-m-phenylenediamine (DAM) for forming random and different block length block polymers of, for example, 6FDA-DAM/CARDO; 6FDA-DAM/6FpDA; and 6FDA-DAM/ABL-21 copolyimides.

In addition, the development of these aromatic copolyimides can also be considered from other monomers that include 3,3'-dihydroxybenzidine, 3,3-(hexafluoroisopropylidene) dianiline, and other bulky diamines, forming such example copolymers as 6FDA-DAM/CARDO (3:1); 6FDA-DAM/CARDO (1:1); 6FDA-DAM/CARDO (1:3); (6FDA-DAM)/(6FDA-CARDO) (1,000-20,000)/(1,000-20,000); 6FDA-DAM/6FpDA (3:1); 6FDA-DAM/6FpDA (1:1); 6FDA-DAM/6FpDA (1:3); (6FDA-DAM)/(6FDA-6FpDA) (1,000-20,000)/(1,000-20,000); 6FDA-DAM/ABL-21 (3:1); 6FDA-DAM/ABL-21 (1:1); 6FDA-DAM/ABL-21 (1:3); (6FDA-DAM)/(6FDA-ABL-21) (1,000-20,000)/(1,000-20,000); (6FDA-DAM)/(6FDA-CARDO)/(6FDA-6FpDA); (6FDA-DAM)/(6FDA-ABL-21)/(6FDA-CARD0); (6FDA-ABL-21)/(6FDA-CARDO)/(6FDA-6FpDA); and combination thereof.

In embodiments of the present disclosure, with respect to random copolyimides, a ratio (1:m) refers to a ratio of millimoles of a first non-FDA monomer:a second non-FDA monomer, unless described otherwise. With respect to block copolyimides a ratio of (1:m) or (1)/(m) refers to either block length l to block length m or a ratio of block length 1 to m, for example block (6FDA-DAM)/(6FDA-ABL-21) (1,000-20,000)/(1,000-20,000).

Embodiments disclosed here show Friedel-Crafts alkylation or acylation applied to aromatic polymers where functional groups such as bulky alkyl or acyl groups are directly introduced to a polymer backbone, and then one or more modified monomer is recovered through the cleaving of the substituted polymer by, for example, hydrazine hydrate. The modified monomers can then be used to form new and useful polymeric membranes via condensation polymerization for sour gas separation under aggressive conditions, for example over about 500 psig, over about 700 psig, or greater than about 900 psig. Suitable bond cleaving reagents of the present disclosure can include any type of suitable hydrazine-based molecule, hydrated, anhydrous, or coupled to organic or inorganic agents. Moreover, suitable cleaving reagents include substituted or non-substituted hydrazine-based molecules, hydrated, anhydrous, or coupled to organic or inorganic agents.

Disclosed chemical modifications here surprisingly and unexpectedly improve the permeability of certain sour mixed gas components, while maintaining selectivity of $H_2S/CH_4$ and $CO_2/CH_4$. Current commercial membranes exhibit sour mixed gas selectivity for $CO_2/CH_4$ and $H_2S/CH_4$ from about 15 to about 25 and permeance of about 80 gas permeation units (GPU) for $CO_2$ and $H_2S$.

Examples have been carried out using monomers including CARDO, 6FDA, durene diamine, 6FpDA, and 4,4'-diaminotriphenylamine (TPA). Chemical modifications have been carried out on 6FDA-CARDO homopolymer, 6FDA-TPA homopolymer, (6FDA-durene)/(6FDA-CARDO) (1:1) block copolymer, 6FDA-durene/CARDO (1:3) random copolymer, and 6FDA-6FpDA/CARDO (3:1) random copolymer.

Figure 1B:
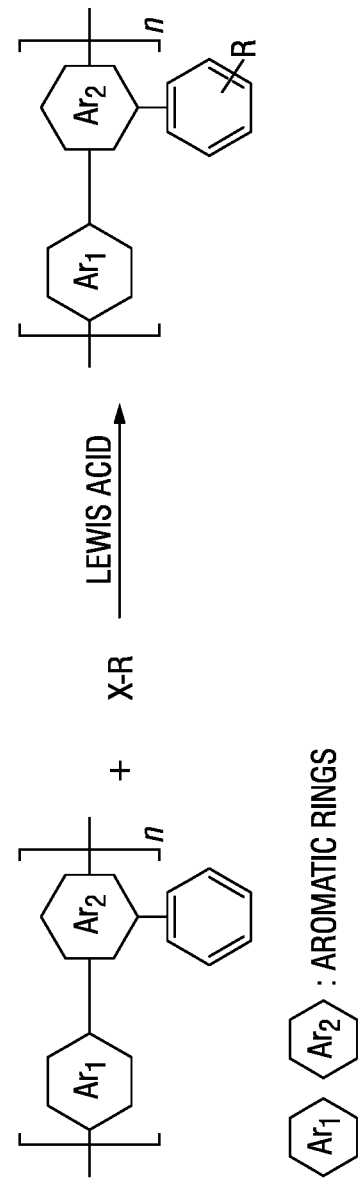
FIG. 1B shows a second scheme for a Friedel-Crafts alkylation or acylation reaction on a prepared polymer, which need not necessarily include a polyimide.

The disclosure is not limited to the bulky alkyl group tert-butyl or to reactive aromatics such as CARDO and TPA. The bulky group can include any alkyl halide (R—X) or acyl halide (R—CO—X) (for example as shown in FIGS. 1A and 1B) susceptible to react in Friedel-Crafts alkylation and acylation reactions. A reactive aromatic can include any aromatic ring with a free reactive site to react in a Friedel-Crafts alkylation or acylation reaction.

Suitable alkyl halides or haloalkanes (R—X) can include any aliphatic or branched alkyl group, where the halide (X) is bonded to a 1°, 2° or 3° carbon atom, under the general form of $C_nH_{2n+1}X$. For example, suitable allylic halides can include molecules where the halide is bonded to an $sp^3$ hybridized 1°, 2°, or 3° carbon atom, the carbon atom being next to a carbon with a carbon-carbon double bond (C=C), or where the carbon chain contains several $sp^2$ hybridized or sp hybridized carbon atoms.

In addition, suitable benzylic halides for bulky group substitution can include any molecule where the halide is bonded to an $sp^3$ hybridized carbon atom next to an aromatic ring, substituted aromatic ring, or several aromatic rings. Suitable vinylic halides can include any molecule where the halide is bonded to an $sp^2$ hybridized carbon atom next to a carbon-carbon double bond (C=C), or a chain than contains several $sp^2$ hybridized or sp hybridized carbon atoms. Suitable aryl halides for bulky group substitution can include any molecule where the halide is bonded to an $sp^2$ hybridized carbon atom of an aromatic ring, substituted ring, or rings. Other suitable halide derivatives can include any molecule that contains one or more halides from the examples listed above (mono, di, tri, tetra, etc.).

Suitable acyl halides can include any molecule where the halide is bonded to a carbonyl group (C=O) in a chain that may contain spa, $sp^2$, and/or sp hybridized carbon atoms, for example acyl chlorides.

In hexafluorodianhydride ("6FDA")-based polyimides, for example produced using 4,4'-(Hexafluoroisopropylidene)diphthalic anhydride, the presence of a $CF_3$ group in the polymer results in chain stiffness, which causes certain membranes incorporating 6FDA to separate molecules based on steric bulk more effectively. The $CF_3$ group also leads to increased permeability due to inhibition of chain packing. As a result, 6FDA-based polyimides can exhibit greater selectivities and greater permeabilities that are within the same order of magnitude when compared to other high-performance polymers. As used herein throughout, the short-hand name of origin monomer units/moieties will be used to refer to final polymerized products, for example 6FDA-durene/CARDO, even though for example certain oxygen atoms of the anhydride groups of 6FDA have been substituted with nitrogen atoms (see, for example, FIG. 1A).

Additionally, gas separation performance of polyimides can be enhanced through copolymerization with other homopolyimides. Copolyimides have the advantage of producing membranes with gas permeabilities and selectivities that cannot be obtained with homopolyimides; and these can be prepared from existing, commercially available materials. In the case of block copolymers, the properties can be adjusted by changing the length and the ratio of the different blocks. The resulting copolyimides can significantly improve gas separation properties without the need of heavy and costly synthetic modifications.

The disclosure provides unique materials for gas separation membrane applications, particularly for acid and sour gas feed separations from natural gas. 9,9-bis(4-aminophenyl) fluorene-(CARDO-) type aromatic copolyimide membranes exhibit excellent pure and gas mixture permeation properties. Aromatic polyimides of the present disclosure exhibit advantageous properties such as high thermal stability, mechanical strength, chemical resistance, and resistance to penetrant induced plasticization when compared to cellulose acetate (CA). Membranes fabricated from polyimides have shown remarkable performance, especially high selectivities for $CO_2/CH_4$ separation. Moreover, the permeation of $N_2$ in aromatic polyimides is higher than $CH_4$, and thus at the end of the separation process the natural gas need not be recompressed, which saves energy.

Membrane materials of the present disclosure exhibit excellent stability at moderate to high pressures and high $H_2S$ concentrations. To enhance separation performance and optimize copolyimides for gas separation, chemical modifications including substitution of other pertinent moieties and bulky functional groups in the copolyimides' backbones can be carried out.

Embodiments of the disclosure show chemical modifications of polyimides that are based upon Friedel-Crafts alkylation or acylation of aromatic polymers, where bulky functional groups can be directly introduced to the polymer backbone. One or more modified monomer is then recovered through the cleaving of the polymer by, for example, hydrazine hydrate, and then new copolymeric and polymeric entities are formed utilizing condensation polymerization (for example to form membrane materials for sour gas upgrading). Such chemical modifications allow for improvement in mixed sour gas permeability of sour gas components, for example $CO_2$, and $H_2S$, while also keeping the selectivity of the $H_2S/CH_4$ and $CO_2/CH_4$ selectivity in the same range of non-modified polyimides and other membrane separation materials.

Example chemical modifications of two homopolymers and several random and block copolymers are shown containing, but not limited to, the following co-monomers: CARDO, 6FDA, durene diamine, 6FpDA, and TPA.

The presence of the monomers CARDO and TPA allowed the use of the Friedel-Crafts alkylation reaction to introduce bulky groups, such as the tert-butyl group, into polymer backbones. The presence of the other co-monomers did not interfere with the modification reaction. The present disclosure is not limited to the aforementioned bulky group (tert-butyl) or reactive aromatics (CARDO and TPA). The bulky group could be any alkyl halide (R—X) or acyl halide (R—CO—X) susceptible to react in Friedel-Crafts alkylation and acylation reactions, and the reactive aromatic could be any aromatic ring with a free reactive site to react in a Friedel-Crafts alkylation/acylation reaction.

Suitable alkyl halides or haloalkanes (R—X) can include any aliphatic or branched alkyl group, where the halide (X) is bonded to a 1°, 2° or 3° carbon atom, under the general form of $C_nH_{2n+1}X$. For example, suitable allylic halides can include molecules where the halide is bonded to an $sp^3$ hybridized 1°, 2°, or 3° carbon atom, the carbon atom being next to a carbon with a carbon-carbon double bond (C=C), or where the carbon chain contains several $sp^2$ hybridized or sp hybridized carbon atoms.

In addition, suitable benzylic halides for bulky group substitution can include any molecule where the halide is bonded to an $sp^3$ hybridized carbon atom next to an aromatic ring, substituted aromatic ring, or several aromatic rings. Suitable vinylic halides can include any molecule where the halide is bonded to an $sp^2$ hybridized carbon atom next to a carbon-carbon double bond (C=C), or a chain than contains several $sp^2$ hybridized or sp hybridized carbon atoms. Suitable aryl halides for bulky group substitution can include any molecule where the halide is bonded to an $sp^2$ hybridized carbon atom of an aromatic ring, substituted ring, or rings. Other suitable halide derivatives can include any molecule that contains one or more halides from the examples listed above (mono, di, tri, tetra, etc.).

Suitable acyl halides can include any molecule where the halide is bonded to a carbonyl group (C=O) in a chain that may contain $sp^3$, $sp^2$, and/or sp hybridized carbon atoms, for example acyl chlorides.

Chemical modifications have been carried out on 6FDA-CARDO homopolymer, 6FDA-TPA homopolymer, (6FDA-durene)/(6FDA-CARDO) (1:1) block copolymer, 6FDA-durene/CARDO (1:3) random copolymer, and 6FDA-6FpDA/CARDO (3:1) random copolymer.

In order to enhance the separation performance even further and optimize copolyimides for gas separation, chemical modifications can be made, which include substitution of other pertinent moieties and bulky functional groups in the copolyimide backbone. These modification steps can significantly improve the performance of copolyimide membranes. Thus, the development of aromatic copolyimides can be considered from other monomers with and without, or in the absence of, crosslinking.

Gas permeation through a dense polymer membrane is governed by the expression in
Equation (1):

$$j_i = \frac{D_i S_i (p_{i0} - p_{i1})}{l} \quad \text{Eq. 1}$$

where ji is the volumetric flux of component i expressed as $(cm^3 (STP))/(cm^2 \cdot s)$, l is the membrane thickness (cm), $p_{i0}$ is the partial pressure of component i on the feed side, and $p_{il}$ is the partial pressure of component i on the permeate side. The diffusion coefficient, Di, reflects the mobility of the individual molecules in the membrane material ($cm^2/s$); the gas sorption coefficient, Si, reflects the amount of molecules dissolved in the membrane material. In a Fickian mechanism, the product DiSi is a measure of the membrane's ability to permeate gas, and can be written as Pi, which is called the membrane permeability.

An important property of a membrane is its ability to achieve the separation of two (or more) different gaseous penetrants. This is the permselectivity, aij. It is represented as shown in Eq. 2:

$$\alpha_{ij} = \frac{P_i}{P_j} = \frac{S_i}{S_j} \times \frac{D_i}{D_j}. \quad \text{Eq. 2}$$

Thus, the selectivity of a membrane to the penetrants i and j is the ratio of $P_i/P_j$ which, in turn, is the product of the solubility selectivity $S_i/S_j$ and the diffusion selectivity $D_i/D_j$. In the case of glassy amorphous polymers and for gases at greater than their critical temperature, $T_c$, it has been found that the permselectivity is primarily controlled by the diffusion selectivity ($D_i/D_j$). The diffusion coefficient D is calculated by Eq. 3:

$$D = \frac{l^2}{6\theta} \quad \text{Eq. 3}$$

where l (cm) is the thickness of the membrane and θ is the time-lag.

Generally, permeation of a gas through dense polymeric membranes is considered as an activated process, which can usually be represented or described by the Van't Hoff-Arrhenius types of equations. This implies that temperature may have a large effect on transport rates. Thus, the effect of temperature on gas solubility, diffusivity and permeability is often described using Van't Hoff-Arrhenius approach. Equations 4, 5, and 6 are as follows:

$$S = S_0 \exp\left(\frac{-\Delta H_s}{RT}\right) \quad \text{Eq. 4}$$

$$D = D_0 \exp\left(\frac{-E_d}{RT}\right) \quad \text{Eq. 5}$$

$$P = P_0 \exp\left(\frac{-E_p}{RT}\right) \quad \text{Eq. 6}$$

where $P_o$ (Barrer), $S_o$ $(cm^3(STP))/(cm^3 \cdot cm \cdot Hg)$ and $D_o$ ($cm^2/sec$) are pre-exponential factors, R is the universal gas constant ($8.314 \times 10^{-3}$ kJ/mol·K), T is the absolute temperature (K), and $E_p$, $\Delta H_s$, and $E_D$ are the activation energy of permeation, the enthalpy of sorption or heat of solution, and the activation energy of diffusion, respectively (kJ/mol).

Transport of gases in polymers is also affected by variation in feed pressures. Changes in gas permeability as a function of pressure in glassy polymers is often explained using a dual-mode model and partial immobilization models. In general, the Langmuir model, which is associated with the "excess" free volume formed in the glassy state, makes a large contribution to the pressure dependence on the permeability in glassy polymers. Moreover, decrease of gas permeability at high pressure is possible, and due at least in part to a decrease of the material free volume in these conditions.

Embodiments which follow show the preparation of modified copolyimides (random and block) made from 6FDA and other modified monomers. In addition, certain embodiments are aimed at achieving enhancement in gas separation properties. Physical and gas transport properties of the copolyimides are examined by investigating properties of pure gases and mixed sour gas consisting of $H_2S$, $CO_2$, $CH_4$, $N_2$ and $C_2H_6$ permeating through the dense films of the copolyimides, for simultaneous separation of $CO_2$, $H_2S$ and $N_2$ from sour gas streams. The $H_2S$ composition in the gas mixture can be about 20 vol. % or more and feed gas pressure and operating temperature can about 600 psi or more and about 22° C., respectively.

EXAMPLES

The following examples are given for the purpose of illustrating embodiments of the invention, however, it is to be understood that these examples are merely illustrative in nature, and that the embodiments of the present invention are not necessarily limited thereto.

FIG. 1A shows a first scheme for a Friedel-Crafts alkylation or acylation reaction on a prepared polyimide. As shown, in the presence of a Lewis acid, an alky group R from an alkyl halide (or an alkyl group R of an acyl halide R—O—X) reacts to bond to the substituent aromatic group bonded to $Ar_2$. FIG. 1B shows a second scheme for a Friedel-Crafts alkylation or acylation reaction on a prepared polymer.

Figure 2A:
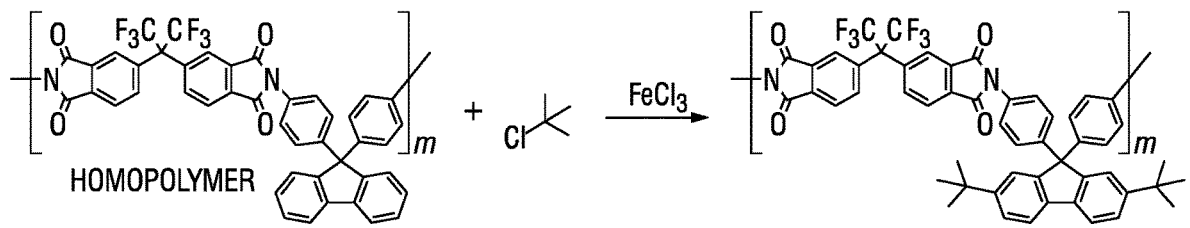
FIG. 2A shows an example Friedel-Crafts alkylation reaction on a 6FDA-CARDO homopolyimide according to the general reaction of the first scheme of FIG. 1A.
Figure 2B:
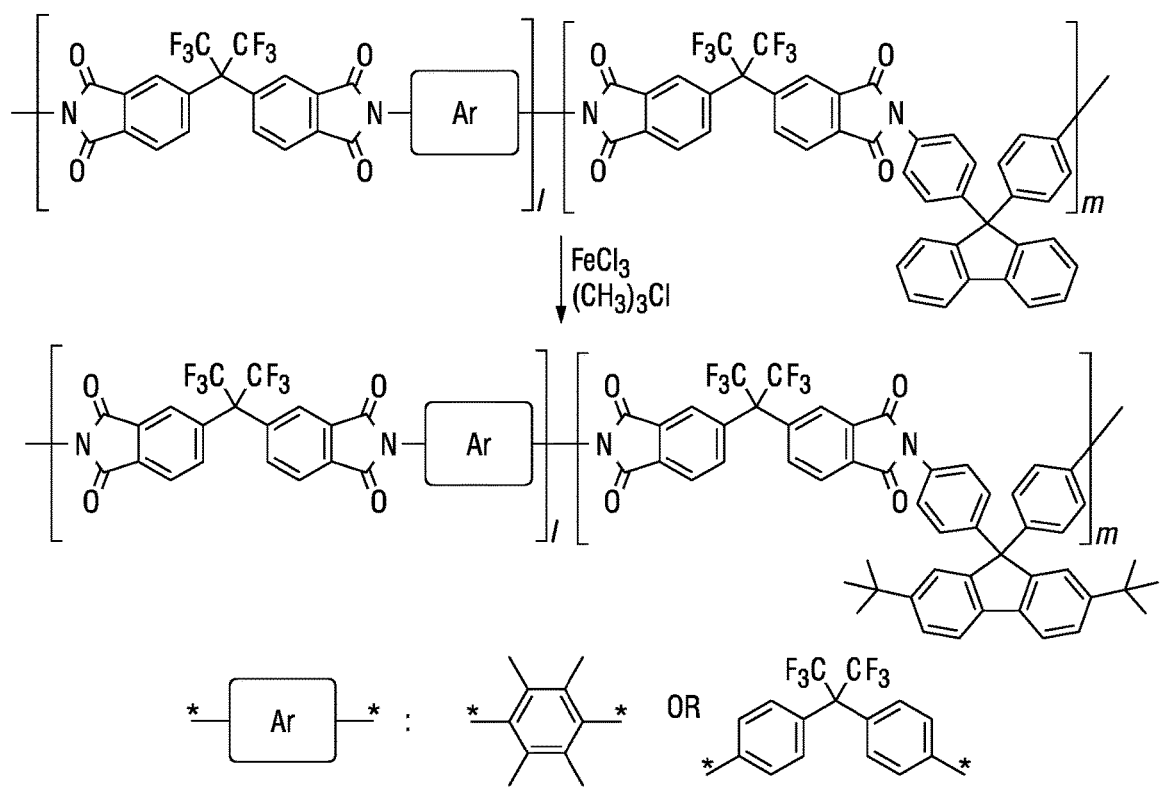
FIG. 2B shows an example Friedel-Crafts alkylation reaction for a 6FDA-durene/CARDO copolyimide and a 6FDA-6FpDA/CARDO copolyimide, where the copolyimides can be random or block copolyimides with varying chain lengths and optional repeatedness of l and m.

FIG. 2A shows an example Friedel-Crafts alkylation reaction on a 6FDA-CARDO homopolyimide according to the general reaction of the first scheme of FIG. 1A. The reaction occurs in the presence of $FeCl_3$, a Lewis acid. Other Lewis acids can be used in addition to or alternative to $FeCl_3$. FIG. 2B shows an example Friedel-Crafts alkylation reaction for a 6FDA-durene/CARDO copolyimide and a 6FDA-6FpDA/CARDO copolyimide, where the copolyimides can be random or block copolyimides with varying lengths and optional repeatedness of blocks 1 and m.

Example 1

Friedel-Crafts Alkylation Reaction on the 6FDA-CARDO Homopolyimide to Produce 6FDA-CARDO(t-Bu)

In a 250 mL one-neck round-bottomed flask, 6FDA-CARDO (4.000 g, 5.08 mmol, 1 eq.) was dissolved in $CH_2Cl_2$ (100 mL), then iron(III) chloride (1.600 g, 9.86 mmol, 1.94 eq.) was introduced to the reaction mixture. 2-chloro-2-methylpropane (6.000 mL, 55.2 mmol, 10.85 eq.) was added dropwise, and the color of the solution turned into a dark red-brown color. The reaction mixture was further stirred overnight at room temperature. The reaction was quenched with water, the organic layer was separated using dichloromethane and dried over magnesium sulfate, and the solvent was evaporated under vacuum. The desired product 6FDA-CARDO(t-Bu) (3.7 g, 4.12 mmol, 81% yield) was obtained as a white off-solid. Characterization results are shown as follows: $^1$H NMR (500 MHz, Chloroform-d) δ8.01 (d, J=8.0 Hz, 2H), 7.92 (s, 2H), 7.83 (d, J=7.8 Hz, 2H), 7.66 (d, J=8.0 Hz, 2H), 7.45-7.40 (m, 4H), 7.38 (d, J=8.4 Hz, 4H), 7.30 (d, J=8.3 Hz, 4H), 1.30 (s, 18H).

Example 2

Friedel-Crafts Alkylation Reaction on the (6FDA-Durene)-(6FDA-CARDO) (1:1) Block Copolyimide to Produce (6FDA-Durene)-(6FDA-CARDO(t-Bu)) (1:1)

In a 250 mL one-neck round-bottomed flask, (6FDA-durene)-(6FDA-CARDO) (1:1) block copolyimide (4.000 g, 2.94 mmol, 1 eq.) was dissolved in $CH_2Cl_2$ (50 mL), then iron(III) chloride (1.500 g, 9.25 mmol, 5.3 eq.) was introduced to the reaction mixture. 2-chloro-2-methylpropane (1.700 mL, 15.63 mmol, 3.14 eq) was added dropwise, and the color of the solution turned into a dark red-brown color. The reaction mixture was further stirred overnight at room temperature. The reaction was quenched with water, the organic layer was separated using dichloromethane and dried over magnesium sulfate, and the solvent was evaporated under vacuum. The desired product (6FDA-durene)-(6FDA-CARDO(t-Bu)) (1:1) block copolyimide (4.29 g, 2.91 mmol, 99% yield) was obtained as a white off-solid. Characterization results are shown as follows: $^1$H NMR (500 MHz, Chloroform-d) δ 8.11-8.06 (m, 2H), 8.01-7.96 (m, 6H), 7.92 (s, 2H), 7.83 (d, J=7.6 Hz, 2H), 7.66 (d, J=7.9 Hz, 2H), 7.45-7.39 (m, 4H), 7.38 (d, J=8.4 Hz, 4H), 7.30 (d, J=8.3 Hz, 4H), 2.14 (s, 12H), 1.30 (s, 18H).

Example 3

Friedel-Crafts Alkylation Reaction on the 6FDA-Durene/CARDO (1:3) Random Copolyimide to Produce 6FDA-Durene/CARDO(t-Bu) (1:3)

In a 250 mL one-neck round-bottomed flask, 6FDA-durene/CARDO (1:3) (4.000 g, 3.01 mmol, 1 eq.) was dissolved in $CH_2Cl_2$ (50 mL), then iron(III) chloride (2.441 g, 15.05 mmol, 5 eq.) was introduced to the reaction mixture. 2-chloro-2-methylpropane (3.27 mL, 30.1 mmol, 10 eq.) was added dropwise, and the color of the solution turned into a dark red-brown color. The reaction mixture was further stirred overnight at room temperature. The reaction was quenched with water, the organic layer was separated using dichloromethane and dried over magnesium sulfate, and the solvent was evaporated under vacuum. The desired product 6FDA-durene/CARDO(t-Bu) (1:3) random copolyimide (3.7 g, 2.52 mmol, 84% yield) was obtained as a white off-solid. Characterization results are shown as follows: $^1$H NMR (500 MHz, Chloroform-d) δ 8.10-8.04 (m, 3H), 8.01 (d, J=7.9 Hz, 7H), 7.92 (s, 8H), 7.83 (d, J=7.1 Hz, 6H), 7.66 (d, J=7.9 Hz, 6H), 7.46-7.39 (m, 12H), 7.38 (d, J=8.1 Hz, 12H), 7.30 (d, J=8.1 Hz, 12H), 2.12 (s, 12H), 1.30 (s, 54H).

Example 4

Friedel-Crafts Alkylation Reaction on the 6FDA-6FpDA/CARDO (3:1) Random Copolyimide to Produce 6FDA-6FpDA/CARDO(t-Bu) (3:1)

In a 250 mL one-neck round-bottomed flask, 6FDA-6FpDA/CARDO (3:1) (5.00 g, 3.27 mmol 1 eq.) was dissolved in $CH_2Cl_2$ (100 mL), then iron(III) chloride (2.65 g, 16.35 mmol, 5 eq.) was introduced to the reaction mixture. 2-chloro-2-methylpropane (3.56 mL, 32.7 mmol, 10 eq.) was added dropwise, and the color of the solution turned into a dark red-brown color. The reaction mixture was further stirred overnight at room temperature. The reaction was quenched with water, the organic layer was separated using dichloromethane and dried over magnesium sulfate, and the solvent was evaporated under vacuum. The desired product 6FDA-6FpDA/CARDO(t-Bu) (3:1) random copolyimide (4.9 g, 2.99 mmol, 91% yield) was obtained as a white off-solid. Characterization results are shown as follows: $^1$H NMR (500 MHz, Chloroform-d) δ 8.08-8.00 (m, 8H), 7.97 (s, 8H), 7.94-7.83 (m, 8H), 7.66 (d, J=7.9 Hz, 2H), 7.59 (d, J=7.5 Hz, 12H), 7.54 (d, J=7.1 Hz, 12H), 7.42 (d, J=7.4 Hz, 4H), 7.38 (d, J=8.1 Hz, 4H), 7.30 (d, J=8.1 Hz, 4H), 1.30 (s, 18H).

Figure 3:
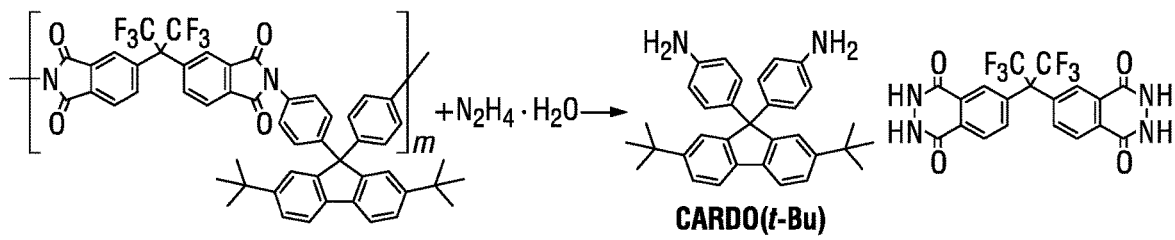
FIG. 3 shows a third scheme for synthetic preparation of a modified CARDO monomer CARDO(t-butyl) ("CARDO (t-Bu)") via hydrazine hydrate cleavage of the polyimide.

The aforementioned Friedel-Crafts alkylation in addition to or alternative to acylation allows for the modification of polymers for the preparation of new monomers that may not be possible when performed on small molecules (monomers) themselves. An example for this is the synthetic scheme depicted in FIG. 3, where tert-butyl functionalized CARDO is prepared. FIG. 3 shows a third scheme for synthetic preparation of a modified CARDO monomer CARDO(t-butyl) ("CARDO(t-Bu)") via hydrazine hydrate cleavage of the homopolyimide.

Figure 4:
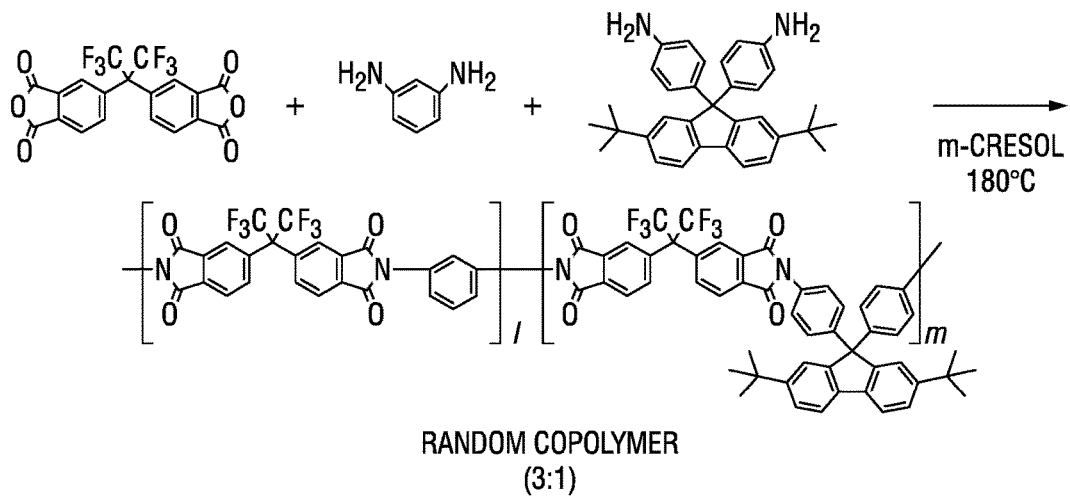
FIG. 4 shows a fourth scheme for synthetic preparation of the random copolyimide 6FDA-mPDA/CARDO(t-Bu) (3:1) from its corresponding modified monomer, CARDO(t-Bu), also shown in FIG. 3.

FIG. 4 shows a fourth scheme for synthetic preparation of the random copolyimide 6FDA-mPDA/CARDO(t-Bu) (3:1) from its corresponding modified monomer, CARDO(t-Bu), also shown in FIG. 3.

Example 5

Synthesis of 4,4'-(2,7-Di-Tert-Butyl-9H-Fluorene-9, 9-Diyl)Dianiline (CARDO(t-Bu))

In a 250 mL three-neck round-bottomed flask, solid 6FDA-CARDO(t-Bu) (17.6 g, 19.58 mmol) polymer was suspended in ethanol (150 mL), and then hydrazine monohydrate (8.00 mL, 107 mmol) was introduced to the reaction mixture. Upon addition of the hydrazine solution, the solid started to dissolve gradually to give a yellow solution. The reaction mixture was further stirred overnight at room temperature. The reaction was quenched with water and the white solid formed was filtered off and dried at 100° C. under vacuum for 24 hours. The desired product 4,4'-(2,7-di-tert-butyl-9H-fluorene-9,9-diyl)dianiline (8.12 g, 17.62 mmol, 90% yield) was obtained as a white off-solid. Characterization results are shown as follows: $^1$H NMR (500 MHz, DMSO-$d_6$) δ 7.68 (d, J=7.8 Hz, 2H), 7.34 (m, 4H), 6.75 (d, J=8.1 Hz, 4H), 6.40 (d, J=8.1 Hz, 4H), 4.89 (s, 4H), 1.25 (s, 18H).

Example 6

Synthesis of the Random Copolymer 6FDA-mPDA/CARDO(t-Bu) (3:1)

In a 100 mL three-neck round bottom flask equipped with a nitrogen inlet and a mechanical stirrer, benzene-1,3-diamine (0.704 g, 6.51 mmol) (mPDA), 4,4'-(2,7-di-tert-butyl-9H-fluorene-9,9-diyl)dianiline (1.000 g, 2.171 mmol) (CARDO(t-Bu)), and 5,5'-(perfluoropropane-2,2-diyl)bis(isobenzofuran-1,3-dione) (3.86 g, 8.68 mmol) (6FDA) were suspended in m-cresol (volume: 22 mL). The reaction mixture was heated at 180° C. for 8 hours. The volume of the solvent was maintained constant during the course of the reaction. The solution was diluted with an additional 10 mL of m-cresol while still hot, and the resulting highly viscous solution was poured into methanol. The solid polymer obtained was stirred in methanol overnight, then filtered and dried partially. The polymer was further washed twice in methanol (2×400 mL methanol) over two days. The final product 6FDA-mPDA/CARDO(t-Bu) (3:1) (5.84 g, 4.12 mmol, 95% yield) was filtered off then dried under reduced pressure at 150° C. for two days. Characterization results are shown as follows: $^1$H NMR (500 MHz, Chloroform-d) δ 8.03-8.00 (m, 8H), 7.96-7.91 (m, 8H), 7.89-7.79 (m, 8H), 7.65 (s, 8H), 7.59-7.52 (m, 6H), 7.42 (d, J=9.1 Hz, 4H), 7.38 (d, J=9.0 Hz, 4H), 7.30 (d, J=7.3 Hz, 4H), 1.30 (s, 18H).

A similar attempted chemical modification to produce random copolymer 6FDA-mPDA/CARDO(t-Bu) from 6FDA, mPDA, CARDO, and 2-chloro-2-methylpropane in the presence of the mPDA moiety was not successful. Without being bound by any theory or practice, the flat benzene ring of mPDA is believed to form a complex with the metals (Fe and Al) of the Lewis acids used, $FeCl_3$ and $AlCl_3$. Therefore, the preparation of the polymers of the present disclosure using the modified monomers is surprising, unexpected, and advantageous compared to attempted preparation of polyimides from typical monomer units alone.

Figure 5:
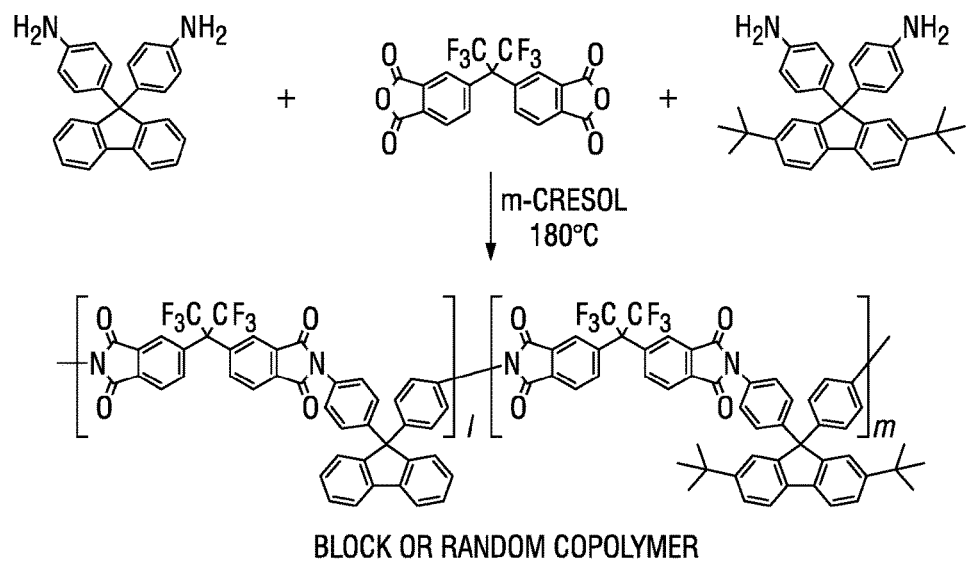
FIG. 5 shows a fifth synthetic scheme for the preparation of 6FDA-CARDO/CARDO(t-Bu) block and random copolyimides.

FIG. 5 shows a fifth synthetic scheme for the preparation of CARDO/CARDO(t-Bu) block and random copolyimides.

Example 7

Synthesis of the Random Copolymer 6FDA-CARDO/CARDO(t-Bu) (2:1)

In a 100 mL three-neck round-bottomed flask equipped with a nitrogen inlet and a mechanical stirrer, 4,4'-(9H-fluorene-9,9-diyl)dianiline (1.045 g, 3.000 mmol) (CARDO) was dissolved in m-cresol (5.00 mL), then 5,5'-(perfluoropropane-2,2-diyl)bis(isobenzofuran-1,3-dione) (1.132 g, 2.549 mmol) (6FDA) was added with m-cresol (5.00 mL). The mixture was heated at 180° C. for 8 hours. Then the solution was diluted progressively by the addition of m-cresol (5 mL). After that, the mixture was cooled to room temperature and 4,4'-(2,7-di-tert-butyl-9H-fluorene-9,9-diyl)dianiline (0.691 g, 1.500 mmol) (CARDO(t-Bu)), 5,5'-(perfluoropropane-2,2-diyl)bis(isobenzofuran-1,3-dione) (0.867 g, 1.951 mmol) (6FDA) and m-cresol (10 mL) were added. The mixture was heated again at 180° C. for 8 hours. The solution was diluted during the reaction by the addition of m-cresol (6 mL). After cooling down, the resulting highly viscous solution was poured into methanol in thin fibers. The fibrous polymer obtained was ground, rinsed with methanol, filtered and dried under reduced pressure for 24 h at 60° C. to afford 6FDA-CARDO/CARDO(t-Bu) (2:1) (3.44 g, 1.426 mmol, 95% yield) as a white off-powder.

Figure 6:
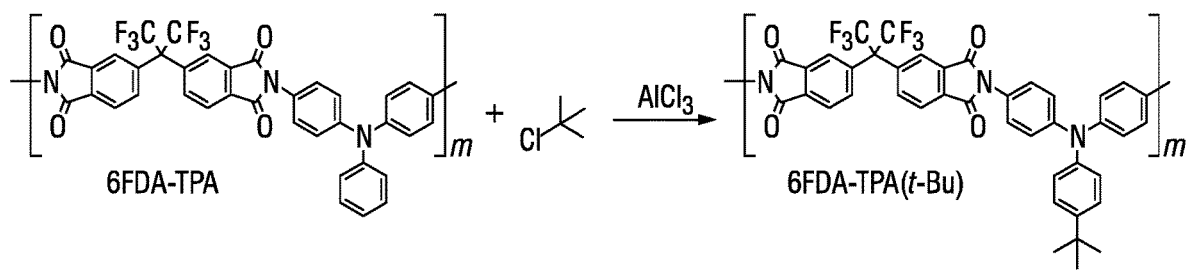
FIG. 6 shows a sixth synthetic scheme for a Friedel-Crafts alkylation reaction on 6FDA-TPA homopolyimide.

In order to extend the application of this modification to moieties other than CARDO, 6FDA-TPA homopolymer was successfully subjected to Friedel-Crafts alkylation to obtain 6FDA-TPA(t-Bu) as depicted in FIG. 6. FIG. 6 shows a sixth synthetic scheme for a Friedel-Crafts alkylation reaction on 6FDA-TPA homopolyimide.

Example 8

Friedel-Crafts Alkylation Reaction on 6FDA-TPA to Produce 6FDA-TPA(t-Bu)

In a 250 mL one-neck round-bottomed flask, 6FDA-TPA (0.400 g, 0.561 mmol) was dissolved in $CH_2Cl_2$ (20 mL), then aluminum trichloride (0.075 g, 0.561 mmol) was introduced to the reaction mixture. 2-chloro-2-methylpropane (0.610 mL, 5.61 mmol) was added dropwise, and the color of the solution turned into dark purple. The reaction mixture was further stirred overnight at room temperature. The FTIR spectrum of a sample of a solid polymer precipitated in methanol showed that a reaction occurred since the FTIR stretch bands were observed for the tert-butyl group. The reaction was quenched with water, and the organic layer was separated using dichloromethane and dried over magnesium sulfate. Then, the solvent was evaporated under vacuum. The desired product 6FDA-TPA(t-Bu) (0.410 g, 0.532 mmol, 95% yield) was obtained as a white off-solid. Characterization results are shown as follows: $^1$H NMR (500 MHz, Chloroform-d) δ 8.02 (d, J=7.9 Hz, 2H), 7.93 (s, 2H), 7.85 (d, J=7.4 Hz, 2H), 7.33 (d, J=8.1 Hz, 2H), 7.27 (d, J=8.6 Hz, 4H), 7.22 (d, J=8.5 Hz, 4H), 7.12 (d, J=8.1 Hz, 2H), 1.32 (s, 9H).

The chemical structures of the modified polyimides were confirmed by $^1$H NMR and FTIR and the yield of the reactions was generally found to be greater than about 80%. For example, FIGS. 7 and 8 show the $^1$H-NMR spectra of the modified random copolymer 6FDA-durene/CARDO (1:3).

Figure 7:
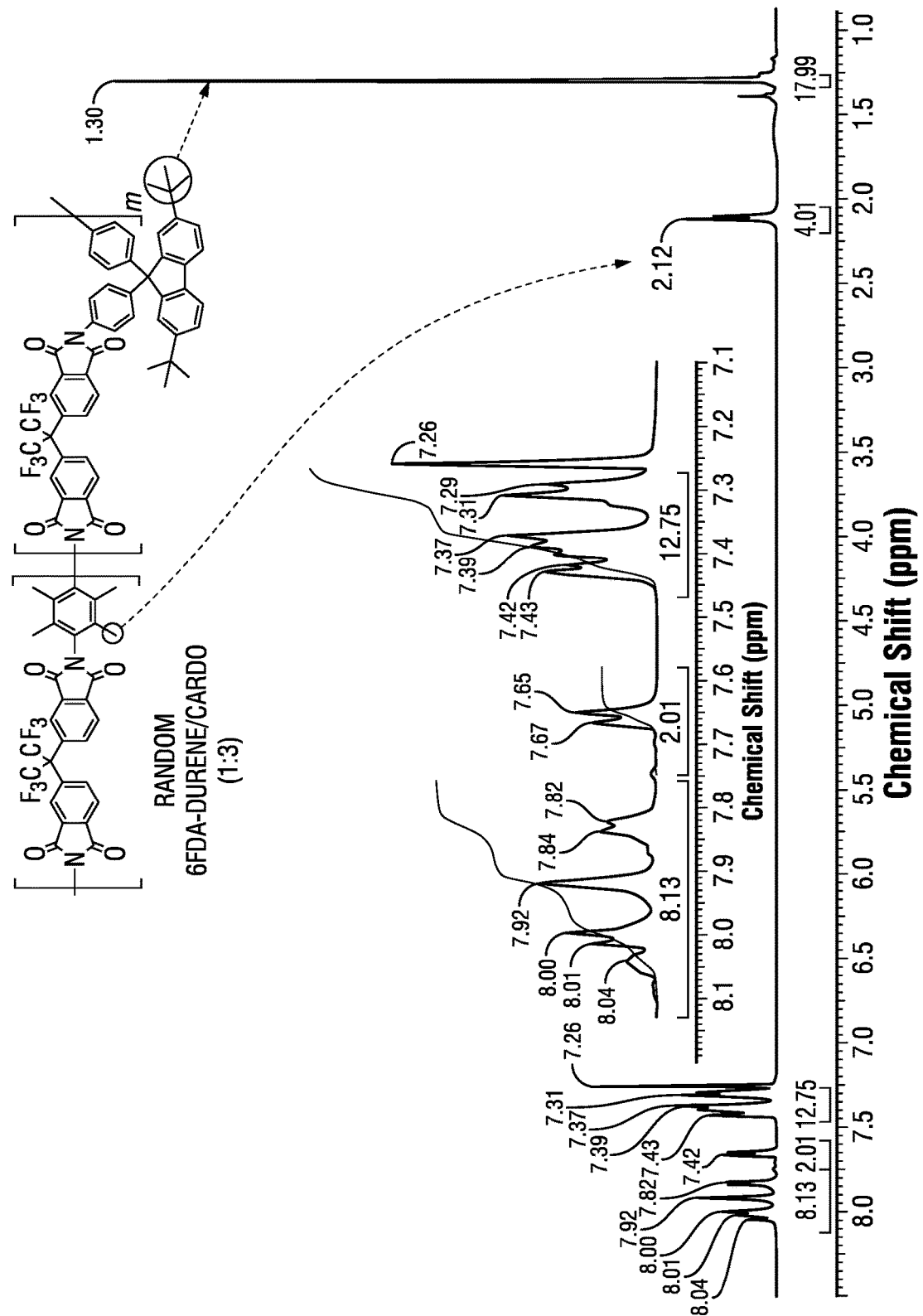
FIG. 7 shows the $^1$H nuclear magnetic resonance (NMR) spectrum, deuterated chloroform (CDCl$_3$), of the 6FDA-durene/CARDO (1:3) random copolyimide.
Figure 8:
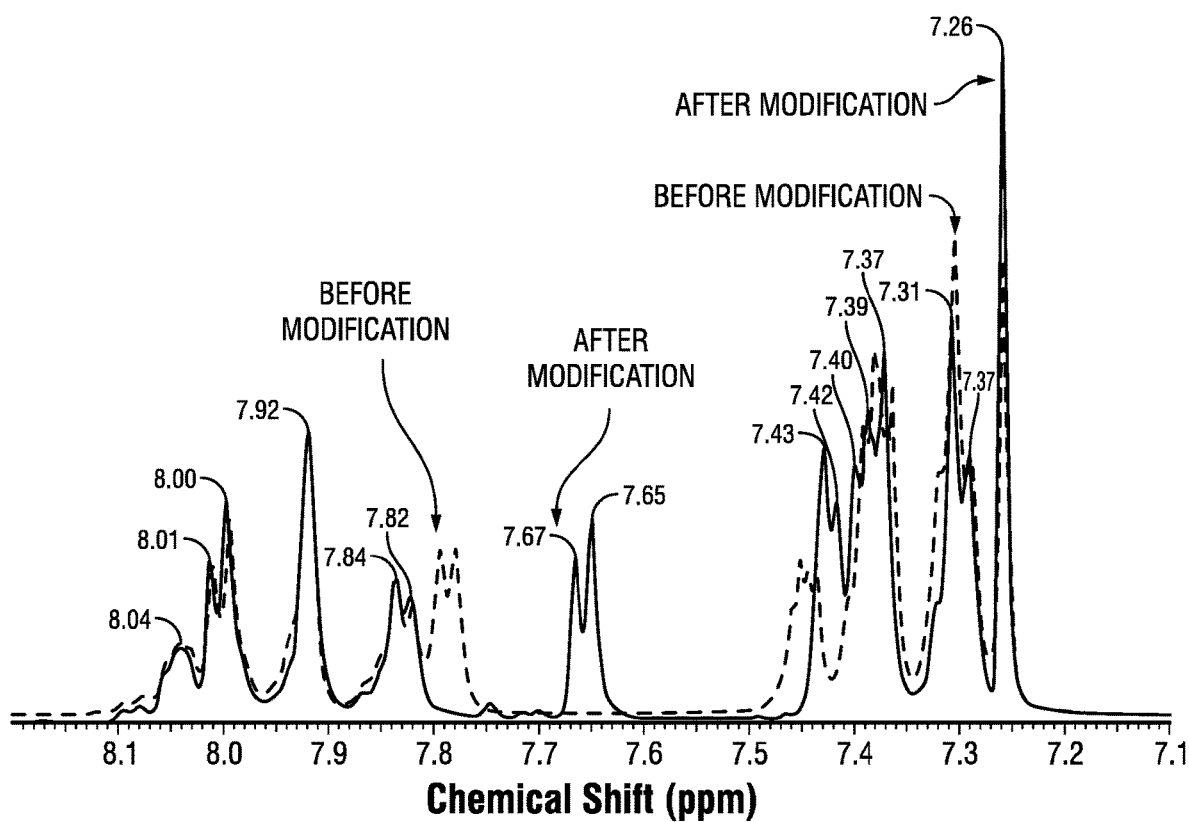
FIG. 8 shows an enlarged portion of FIG. 7 with the $^1$H NMR spectra (CDCl$_3$) of the 6FDA-durene/CARDO (1:3) random copolyimide before modification and 6FDA-durene/CARDO(t-Bu) (1:3) after modification.

FIG. 7 shows the $^1$H NMR spectrum (CDCl$_3$) of the 6FDA-durene/CARDO (1:3) random copolyimide. The $^1$H-NMR spectrum shows the successful substitution of the tert-butyl groups on both sides of the fluorenyl moiety (2 and 7 positions) by the appearance of the singlet peak at 1.30 ppm. The signal integration ratio of the corresponding tert-butyl groups (18H) and the corresponding aromatic protons of the CARDO moiety (14H) shows that the reaction was complete. FIG. 8 shows an enlarged portion of FIG. 7 with $^1$H NMR spectra (CDCl$_3$) of the 6FDA-durene/CARDO (1:3) random copolyimide before modification and 6FDA-durene/CARDO(t-Bu) (1:3) after modification.

Figure 9:
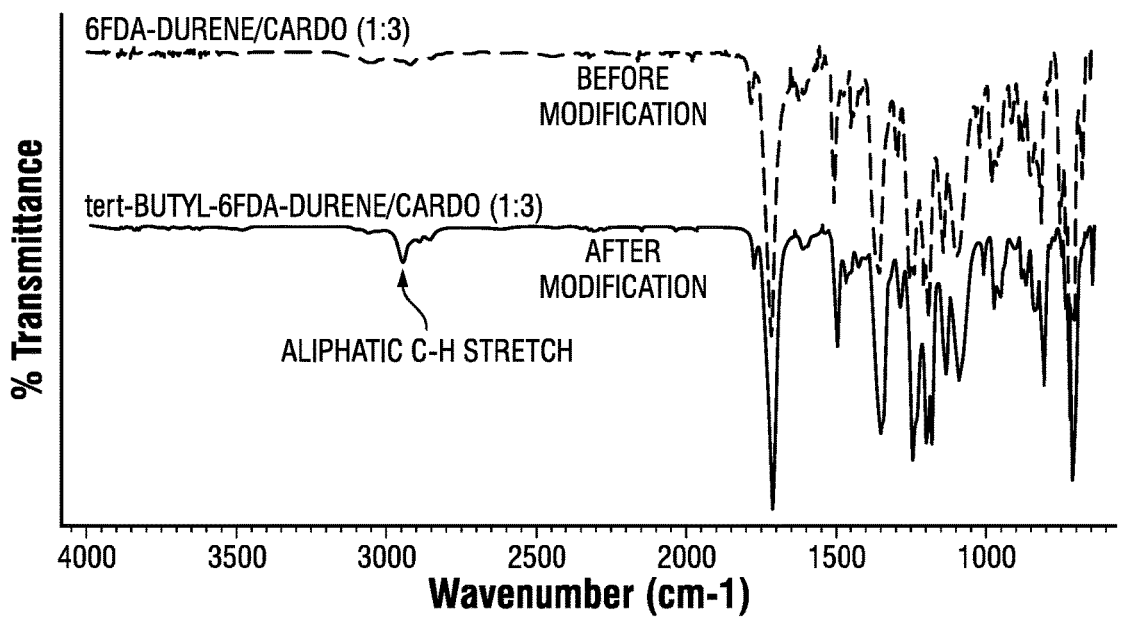
FIG. 9 shows Fourier-transform infrared (FTIR) spectra of the 6FDA-durene/CARDO (1:3) random copolyimide before modification and 6FDA-durene/CARDO(t-Bu) (1:3) after modification.

FIG. 9 shows FTIR spectra of the 6FDA-durene/CARDO (1:3) random copolyimide before modification and 6FDA-durene/CARDO(t-Bu) (1:3) after modification. In a similar way, the FTIR analysis showed the appearance of the C—H aliphatic stretching bands (2800-3000 cm$^{-1}$) that correspond to the new tert-butyl groups added to the polymer backbone.

Figure 10:
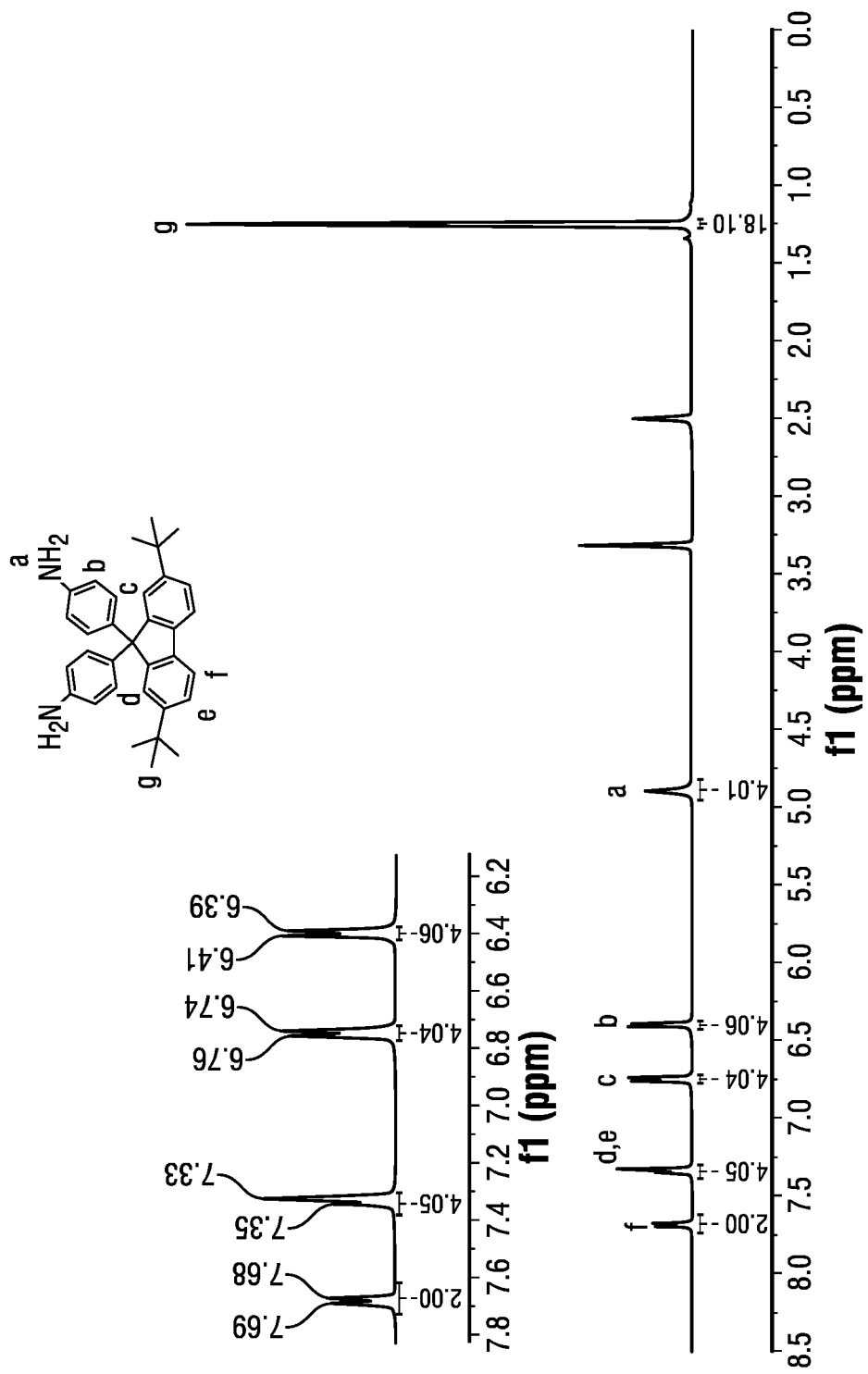
FIG. 10 shows the structure of the newly-prepared modified monomer 4,4'-(2,7-di-tert-butyl-9H-fluorene-9,9-diyl) dianiline (CARDO(t-Bu)), which was confirmed by $^1$H NMR spectrum (dimethyl sulfoxide (DMSO)-d$_6$).

FIG. 10 shows the structure of the newly-prepared modified monomer 4,4'-(2,7-di-tert-butyl-9H-fluorene-9,9-diyl) dianiline (CARDO(t-Bu)), which was confirmed by $^1$H NMR spectrum (DMSO-d$_6$).

Figure 11:
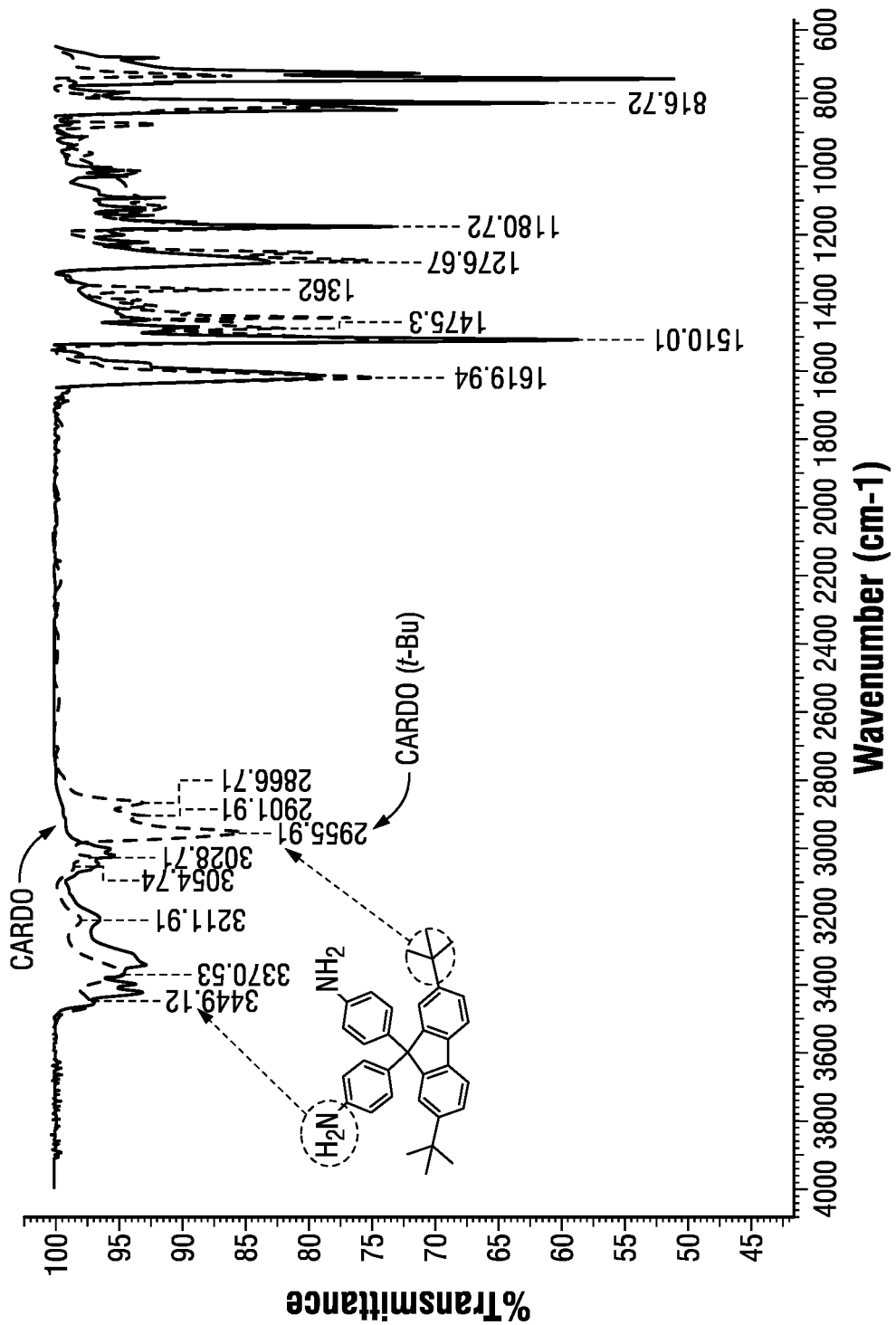
FIG. 11 shows an overlay FTIR spectra for both the CARDO monomer and the CARDO(t-Bu) monomer.

FIG. 11 shows an overlay FTIR spectra for both the CARDO monomer and the CARDO(t-Bu) monomer. Moreover, FIG. 11 shows a distinguished difference between the two spectra is absorption bands between 2955-2866 cm$^{-1}$ that correspond to the C—H stretching of the tert-butyl group.

Figure 12:
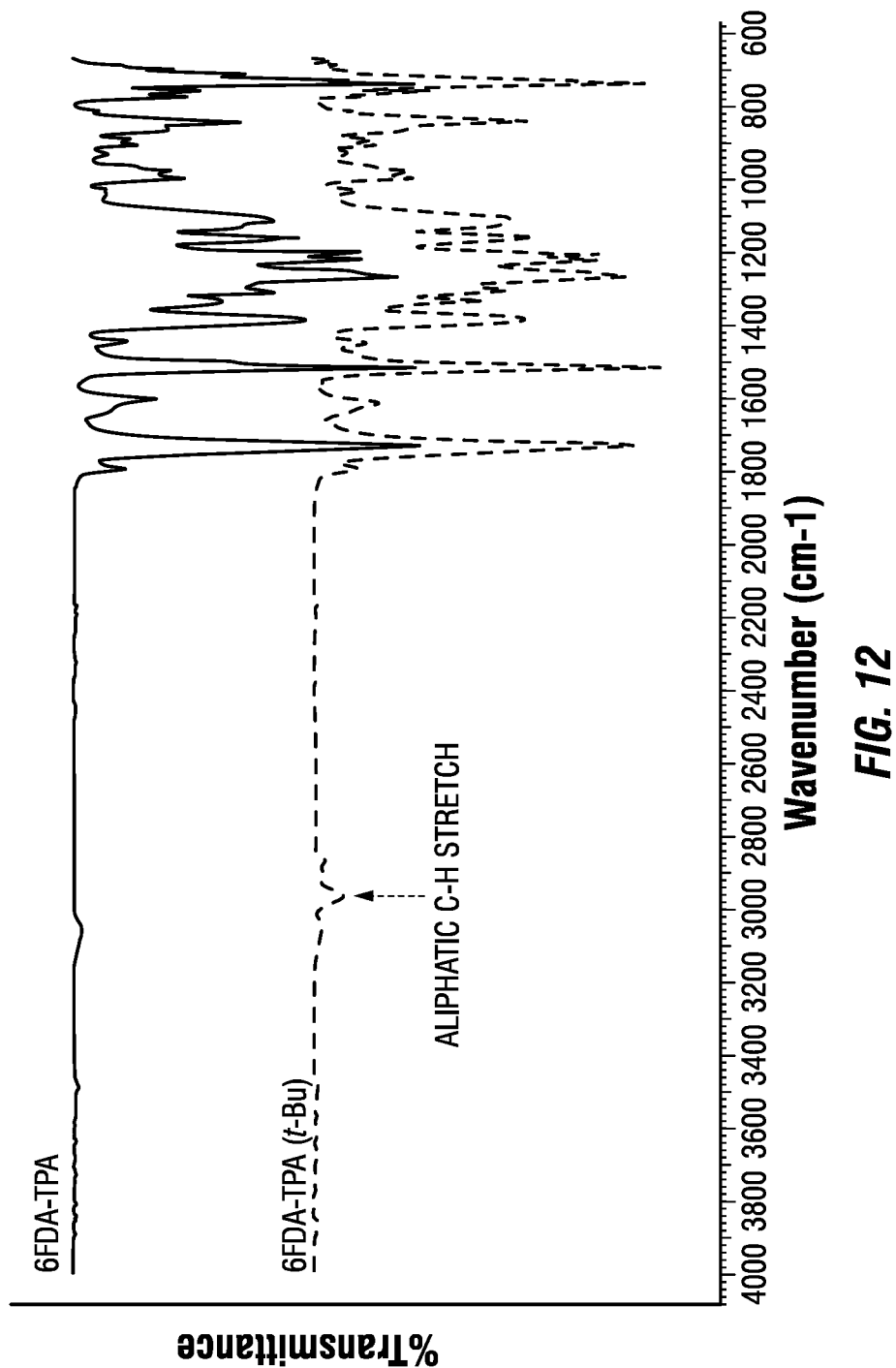
FIG. 12 shows FTIR spectra of the 6FDA-TPA homopolymer and the 6FDA-TPA(t-Bu) homopolymer.

FIG. 12 shows FTIR spectra of the 6FDA-TPA homopolymer and the 6FDA-TPA(t-Bu) homopolymer. In a similar way, the FTIR analysis of the modification of 6FDA-TPA to prepare 6FDA-TPA(t-Bu) shows the appearance of the C—H aliphatic stretching bands (2800-3000 cm$^{-1}$) that correspond to the new tert-butyl groups introduced to the polymer backbone.

Figure 13:
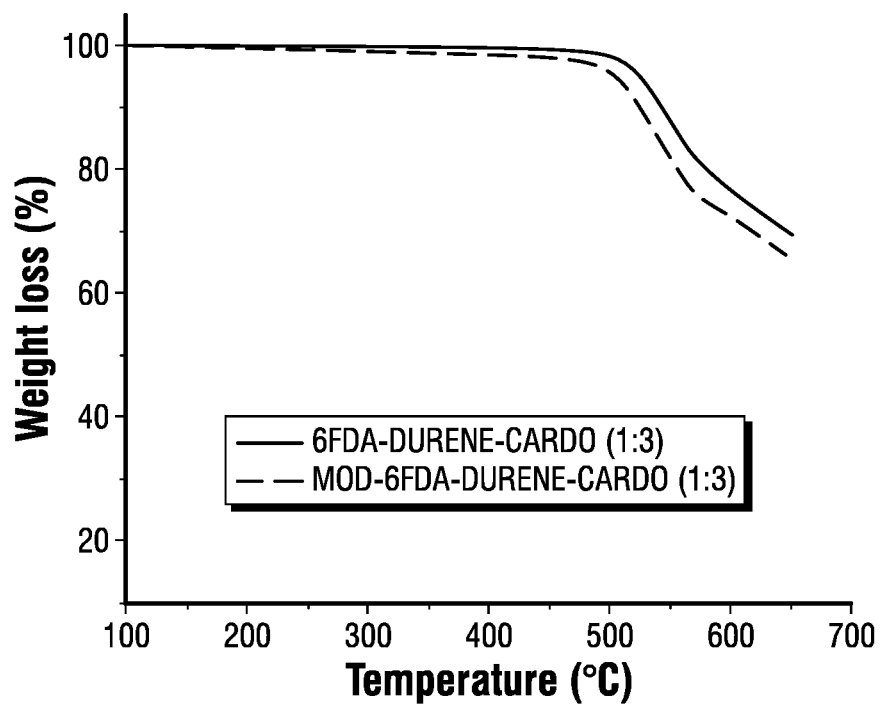
FIG. 13 shows a graph for thermogravimetric analysis (TGA) of 6FDA-durene/CARDO (1:3) and modified 6FDA-durene/CARDO(t-Bu) (1:3).

FIG. 13 shows a graph for thermogravimetric analysis (TGA) analysis of 6FDA-durene/CARDO (1:3) and modified 6FDA-durene/CARDO(t-Bu) (1:3). The thermal stability of the modified polyimides was measured by TGA and was found to be similar to that of the parent, unmodified polyimides, which indicates the thermal stability of the polymeric material after the chemical modification with alkyl or acyl bulky groups.

Figure 14:
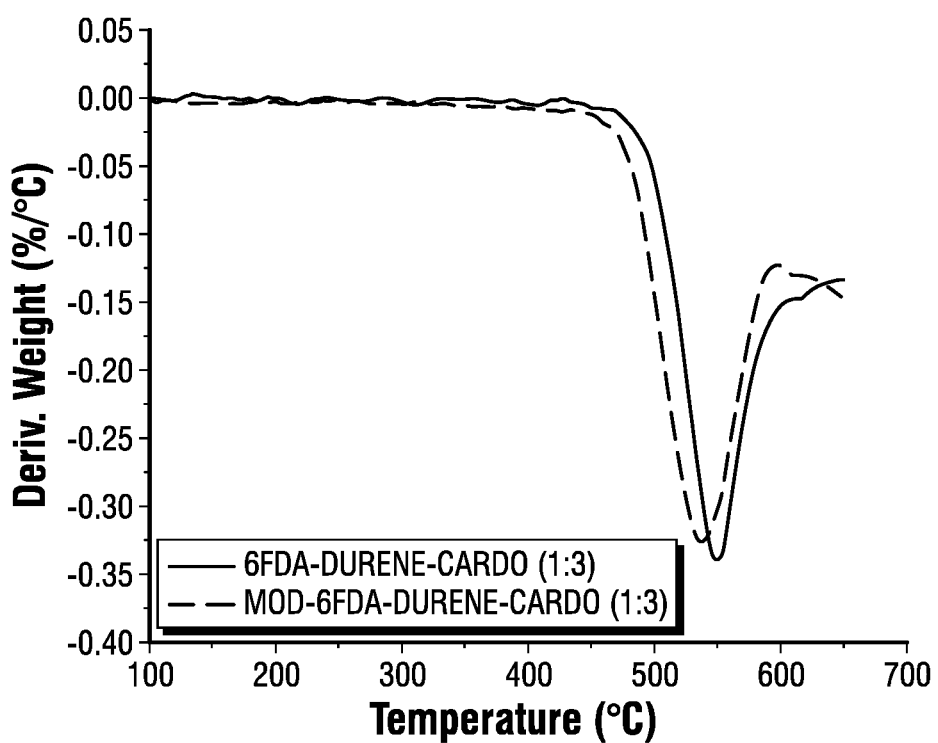
FIG. 14 is a graph showing TGA with differential weight-loss curves (DTG traces) of the 6FDA-durene/CARDO (1:3) random copolyimide before modification and 6FDA-durene/CARDO(t-Bu) (1:3) after modification.

FIG. 14 is a graph showing TGA with DTG traces of the 6FDA-durene/CARDO (1:3) random copolyimides before and after modification with alkyl bulky groups. Once again, the modification of the polymer backbones of the polymers has not substantially affected the thermal stability.

The characteristic temperatures determined from the TGA and DTG plots are listed in Table 1. The TGA plots depict the weight loss of the polymeric membranes when heated at 10° C./min for a range between 100° C. and 650° C. The temperature at a total of 5% and 10% weight losses are usually reported as an indication of the thermal stability of similar polymeric membranes. The first derivative of a TGA curve, known as DTG, depicts the rate of decomposition of the material studied. For the block polymers, 1 and m can be between about 1,000 to about 20,000 units, and in the block polymer examples shown (1:1) indicates the molar ratio of monomers in both segments of the block co-polymer compared to each other.

TABLE 1

Characteristic temperatures (° C.) for DSC, TGA and DTG.

| Polyimide membrane | $T_g$ (° C.) | $T_{d5\%}$ (° C.) wt. loss | $T_{d10\%}$ (° C.) wt. loss | DTG (° C.) |
|---|---|---|---|---|
| 6FDA-CARDO | 393 | 543 | 560 | 555 |
| 6FDA-CARDO(t-Bu) | 366 | 517 | 535 | 537 |
| (6FDA-durene)$_l$/(6FDA-CARDO)$_m$ (1:1) | 397 | 522 | 542 | 548 |
| (6FDA-durene)$_l$/(6FDA-CARDO(t-Bu))$_m$ (1:1) | 376 | 509 | 530 | 550 |
| 6FDA-durene/CARDO (1:3) | 394 | 527 | 544 | 547 |
| 6FDA-durene/CARDO(t-Bu) (1:3) | 377 | 505 | 525 | 537 |
| 6FDA-6FpDA/CARDO (3:1) | 341 | 531 | 545 | 555 |
| 6FDA-6FpDA/CARDO(t-Bu) (3:1) | 336 | 517 | 534 | 552 |
| 6FDA-mPDA/CARDO (3:1) | 331 | 531 | 547 | 552 |
| 6FDA-mPDA/CARDO(t-Bu) (3:1) | 326 | 516 | 537 | 553 |
| 6FDA-TPA | 316 | 526 | 548 | 556 |
| 6FDA-TPA(t-Bu) | 301 | 515 | 532 | 540 |

Figure 15:
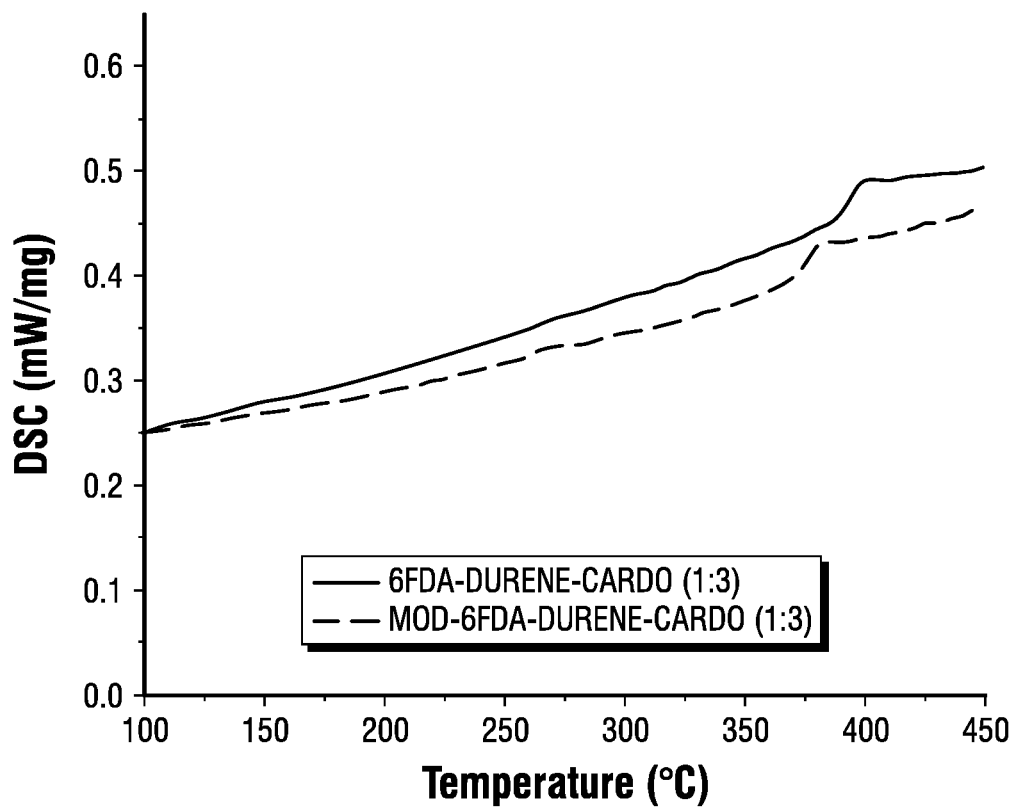
FIG. 15 is a graph showing differential scanning calorimetry (DSC) traces of the 6FDA-durene/CARDO (1:3) random copolyimide before modification and 6FDA-durene/CARDO(t-Bu) (1:3) after modification.

The differential scanning calorimetry (DSC) traces for the prepared copolyimides were recorded. FIG. 15 illustrates the DSC traces of the parent and modified (t-Bu) random 6FDA-durene-CARDO (1:3) copolyimides.

The DSC traces show that the glass transition temperature ($T_g$) decreases after modification, implying a decrease in chain stiffness upon the incorporation of the bulky groups, which likely allows some freedom in chain mobility. This trend is observed in all the examples discussed, as shown by the $T_g$ values in Table 1.

Membrane preparation for gas separation testing.

Dense film membranes of about 50-150 μm thickness were prepared by casting 3 wt. % solutions of the prepared polyimides in chloroform or dimethyl formamide (DMF) onto glass Petri dishes. Beforehand, the solutions were filtered using 0.45 μm polytetrafluoroethylene (PTFE) filters to remove undissolved polymer material or dust particles. The cast solutions were left at room temperature under a glass lid (or in an oven at 70° C. for DMF) for 24 hours for slow solvent evaporation. The formed membranes obtained were then heated at 60° C. for 24 hours under nitrogen flow. The drying temperature was raised to 150° C., and the membranes were dried under vacuum for 24 hours. Finally, to peel off the membranes from the Petri dishes, the membrane samples were soaked in deionized water for 15 minutes and then dried at 60° C. in a vacuum oven for 6 hours to remove water.

Sweet mixed gas permeation measurements.

As an example, the sweet mixed gas permeation data were measured for the two homopolymers 6FDA-CARDO and 6FDA-CARDO(t-Bu) in order to study the effect of the chemical modification on their transport properties. For this, the two membranes were subjected to a sweet mixed gas containing 10, 59, 30, and 1 vol. % of $CO_2$, $CH_4$, $N_2$ and $C_2H_6$, respectively. The permeation measurements were recorded at various feed pressures (100-700 psi) at a fixed temperature of 22° C. The obtained results are depicted in Table 2 and FIGS. 16A, 16B, 17A, and 17B.

Figure 18:
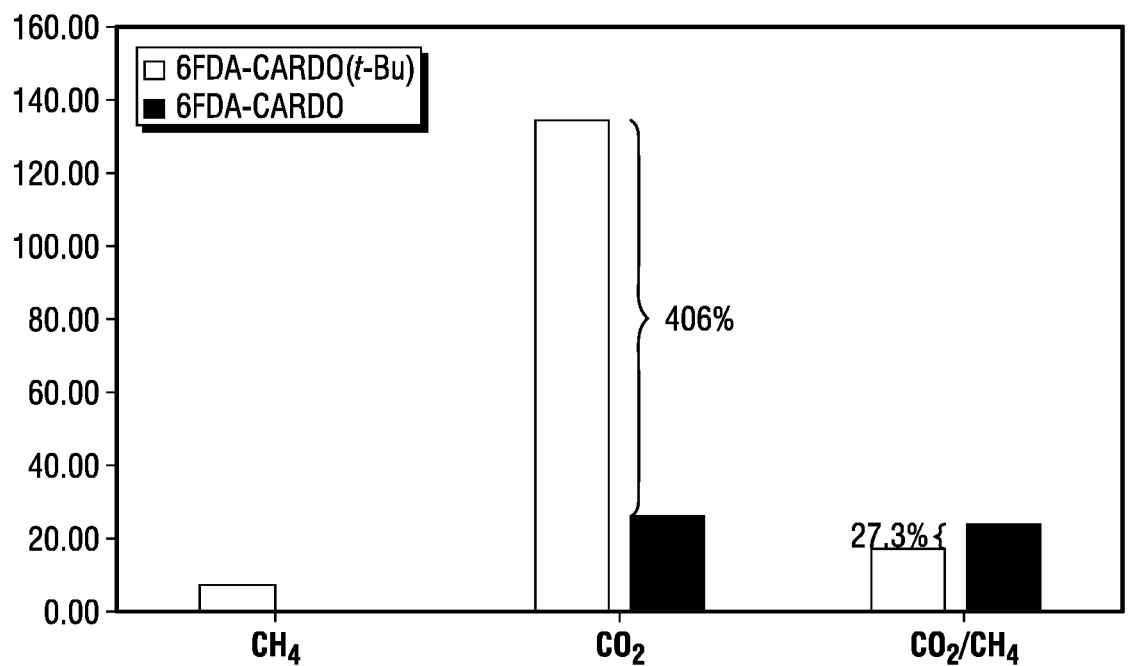
FIG. 18 is a column chart comparing the $CO_2/CH_4$ sweet mixed-gas permeability and selectivity coefficients of 6FDA-CARDO and 6FDA-CARDO(t-Bu) at 500 psi and 22° C.

FIG. 18 is a column chart comparing the $CO_2/CH_4$ sweet mixed-gas permeability and selectivity coefficients of 6FDA-CARDO and 6FDA-CARDO(t-Bu) at 500 psi and 22° C. The sweet mixed gas permeation results show a clear improvement on the permeability coefficient when comparing the gas transport data of 6FDA-CARDO to that of 6FDA-CARDO(t-Bu), which represents its modified version. The $CO_2$ permeability coefficient, at 500 psi for example, surprisingly and unexpectedly increased from 26.6 Barrer to 134.7 Barrer (about 406% improvement), accompanied by a drop of $CO_2/CH_4$ selectivity of only about 27.3% (FIGS. 18) (24.70 to 17.96).

TABLE 2

Sweet mixed gas permeability (Barrer) and selectivity coefficients of 6FDA-CARDO, 6FDA-CARDO(t-Bu), and random copolyimide 6FDA-CARDO/CARDO(t-Bu) (2:1) at various feed pressures and 22° C.

| Polymer | P (psi) | $N_2$ | $CH_4$ | $C_2H_6$ | $CO_2$ | $N_2/CH_4$ | $C_2H_6/CH_4$ | $CO_2/CH_4$ |
|---|---|---|---|---|---|---|---|---|
| 6FDA-CARDO | 100 | 0.95 | 1.13 | 1.28 | 30.12 | 0.85 | 1.14 | 26.75 |
|  | 300 | 1.17 | 1.21 | 1.50 | 27.00 | 0.97 | 0.94 | 22.87 |
|  | 400 | 1.01 | 1.09 | 1.04 | 27.61 | 0.93 | 0.96 | 25.38 |
|  | 500 | 1.02 | 1.08 | 0.96 | 26.61 | 0.95 | 0.89 | 24.70 |
|  | 700 | 1.13 | 1.20 | 0.95 | 25.70 | 0.95 | 0.79 | 21.42 |
| 6FDA-CARDO (t-Bu) | 100 | 7.52 | 8.99 | 7.12 | 179.86 | 0.84 | 0.79 | 20.00 |
|  | 200 | 7.62 | 8.71 | 6.65 | 170.48 | 0.88 | 0.76 | 19.58 |
|  | 300 | 7.17 | 8.19 | 7.23 | 163.87 | 0.88 | 0.88 | 20.01 |
|  | 400 | 6.69 | 7.68 | 7.71 | 144.28 | 0.87 | 1.00 | 18.78 |
|  | 500 | 6.13 | 7.50 | 6.65 | 134.74 | 0.82 | 0.89 | 17.96 |
|  | 700 | 5.62 | 6.79 | 6.03 | 116.89 | 0.83 | 0.89 | 17.22 |
| 6FDA-CARDO/ CARDO (t-Bu) | 100 | 2.52 | 2.35 | 0.92 | 91.48 | 1.07 | 0.39 | 38.93 |
|  | 300 | 2.01 | 2.12 | 1.52 | 56.43 | 0.95 | 0.72 | 26.62 |
|  | 400 | 2.04 | 2.15 | 1.69 | 54.11 | 0.95 | 0.79 | 25.17 |
|  | 500 | 1.91 | 2.01 | 1.69 | 51.50 | 0.95 | 0.84 | 25.62 |
|  | 700 | 1.86 | 1.95 | 1.39 | 45.59 | 0.95 | 0.71 | 23.38 |

Figure 16A:
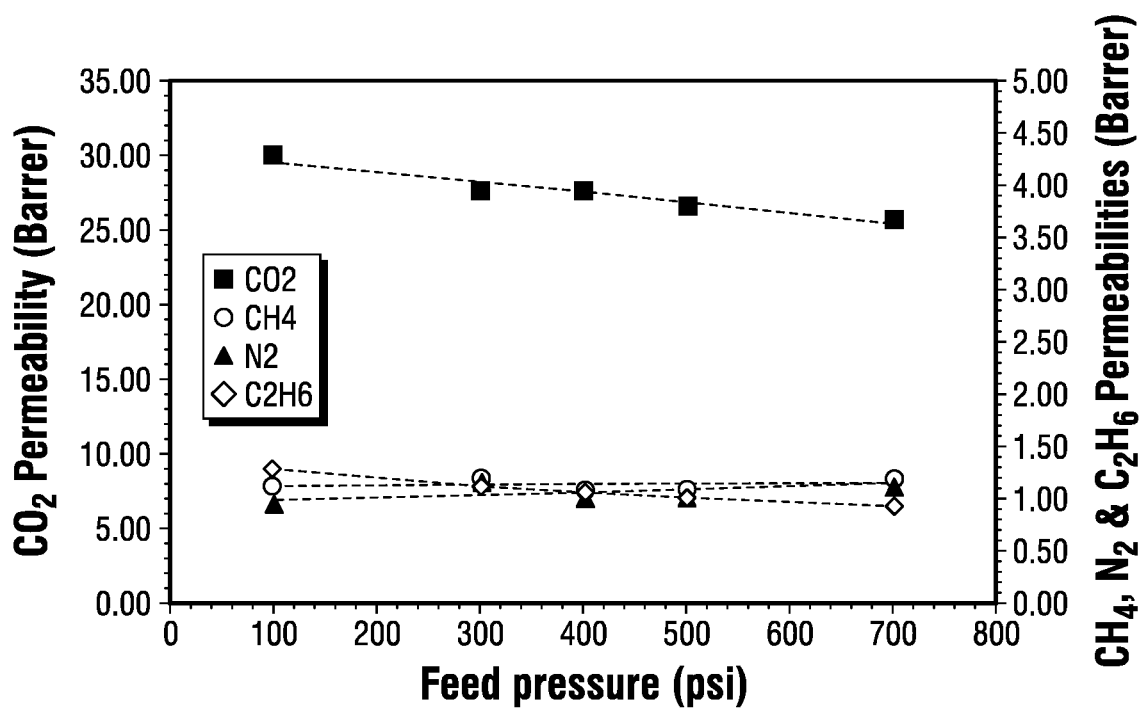
FIG. 16A is a graph showing sweet mixed gas permeabilities for the 6FDA-CARDO homopolymer at various feed pressures and 22° C.
Figure 16B:
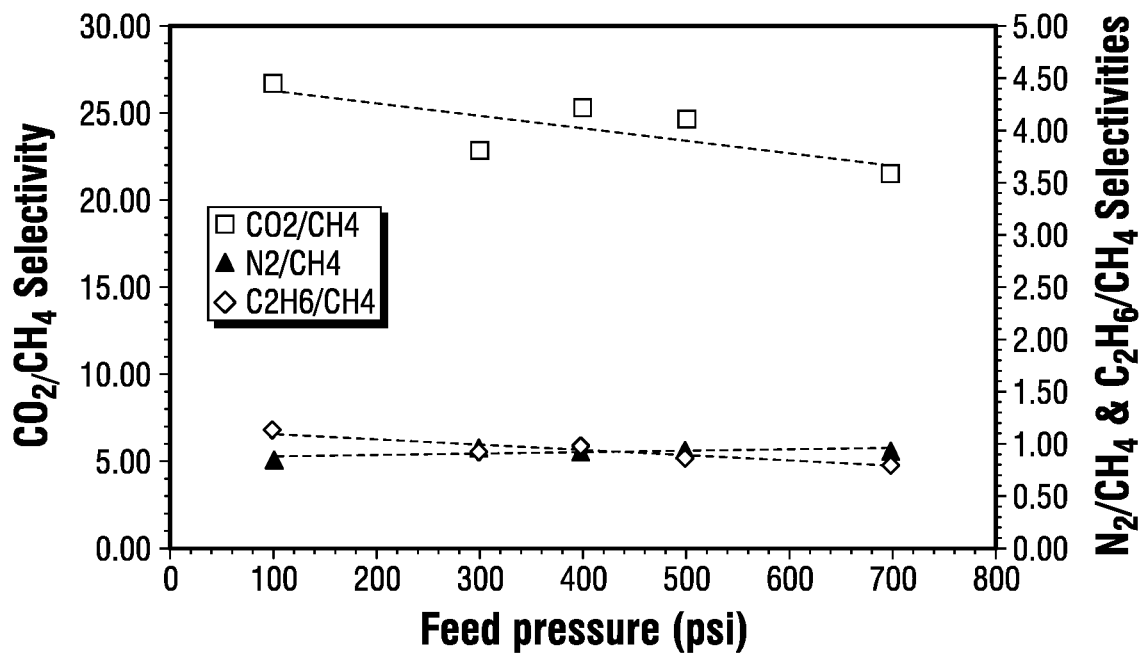
FIG. 16B is a graph showing sweet mixed gas selectivities for the 6FDA-CARDO homopolymer at various feed pressures and 22° C.

FIG. 16A is a graph showing sweet mixed gas permeability for the 6FDA-CARDO homopolymer at various feed pressure and 22° C. FIG. 16B is a graph showing sweet mixed gas selectivity for the 6FDA-CARDO homopolymer at various feed pressure and 22° C.

Figure 17A:
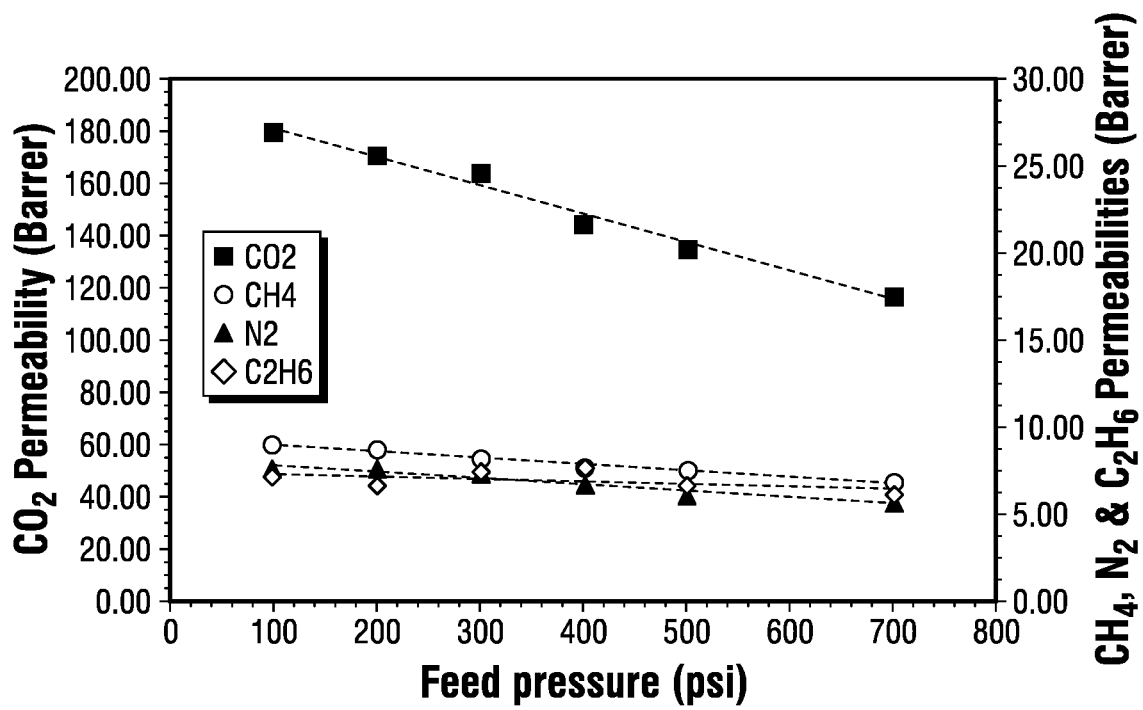
FIG. 17A is a graph showing sweet mixed gas permeabilities for the 6FDA-CARDO(t-Bu) homopolymer at various feed pressure and 22° C.
Figure 17B:
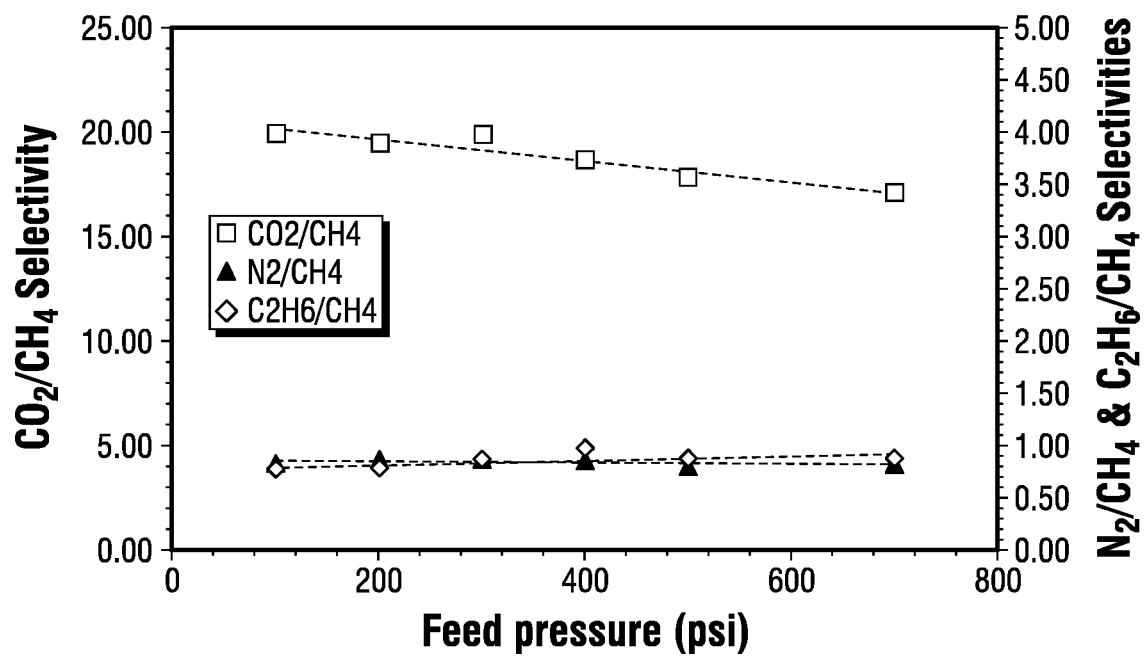
FIG. 17B is a graph showing sweet mixed gas selectivities for the 6FDA-CARDO(t-Bu) homopolymer at various feed pressure and 22° C.

FIG. 17A is a graph showing sweet mixed gas permeability for the 6FDA-CARDO(t-Bu) homopolymer at various feed pressure and 22° C. FIG. 17B is a graph showing sweet mixed gas selectivity for the 6FDA-CARDO(t-Bu) homopolymer at various feed pressure and 22° C. As seen, for example with $CO_2$, the permeability surprisingly and unexpectedly dramatically increases, while selectivity remains similar between the modified and unmodified membranes.

Sour mixed gas permeation measurements.

Sour mixed gas permeation data were measured for 6FDA-CARDO, 6FDA-CARDO(t-Bu), and random copolyimide 6FDA-CARDO/CARDO(t-Bu) (2:1) membranes in order to study the effect of the bulky alkyl group chemical modification on their transport properties. For this, the membranes were subjected to a sour mixed-gas containing 10, 59, 10, 1 and 20 vol. % of $CO_2$, $CH_4$, $N_2$, $C_2H_6$ and $H_2S$, respectively. The permeation measurements were recorded at various feed pressures (300 and 500 psi) at a fixed temperature of 22° C. The obtained results are depicted in Table 3.

TABLE 3

Sour mixed gas permeability (Barrer) and selectivity coefficients for 6FDA-CARDO, 6FDA-CARDO(t-Bu), and random copolyimide 6FDA-CARDO/CARDO(t-Bu) (2:1) at various feed pressures and 22° C.

| Polymer | P (psi) | $N_2$ | $CH_4$ | $C_2H_6$ | $CO_2$ | $H_2S$ | $N_2/CH_4$ | $C_2H_6/CH_4$ | $CO_2/CH_4$ | $H_2S/CH_4$ |
|---|---|---|---|---|---|---|---|---|---|---|
| 6FDA-CARDO | 300 | 2.57 | 1.16 | 1.12 | 25.97 | 26.46 | 2.21 | 0.96 | 22.29 | 22.71 |
|  | 500 | 3.86 | 2.70 | 2.86 | 29.79 | 38.77 | 1.43 | 1.06 | 11.04 | 14.37 |
| 6FDA-CARDO (t-Bu) | 300 | 4.15 | 5.36 | 6.33 | 80.37 | 101.49 | 0.77 | 1.18 | 14.99 | 18.93 |
|  | 500 | 6.58 | 9.20 | 11.81 | 95.07 | 148.49 | 0.72 | 1.28 | 10.33 | 16.14 |
| 6FDA-CARDO/ 6FDA-CARDO (t-Bu) | 300 | 4.10 | 2.31 | 2.20 | 42.57 | 45.37 | 1.78 | 0.95 | 18.44 | 19.66 |
|  | 500 | 4.26 | 2.68 | 2.77 | 44.84 | 53.34 | 1.59 | 1.03 | 16.72 | 19.89 |

Figure 19:
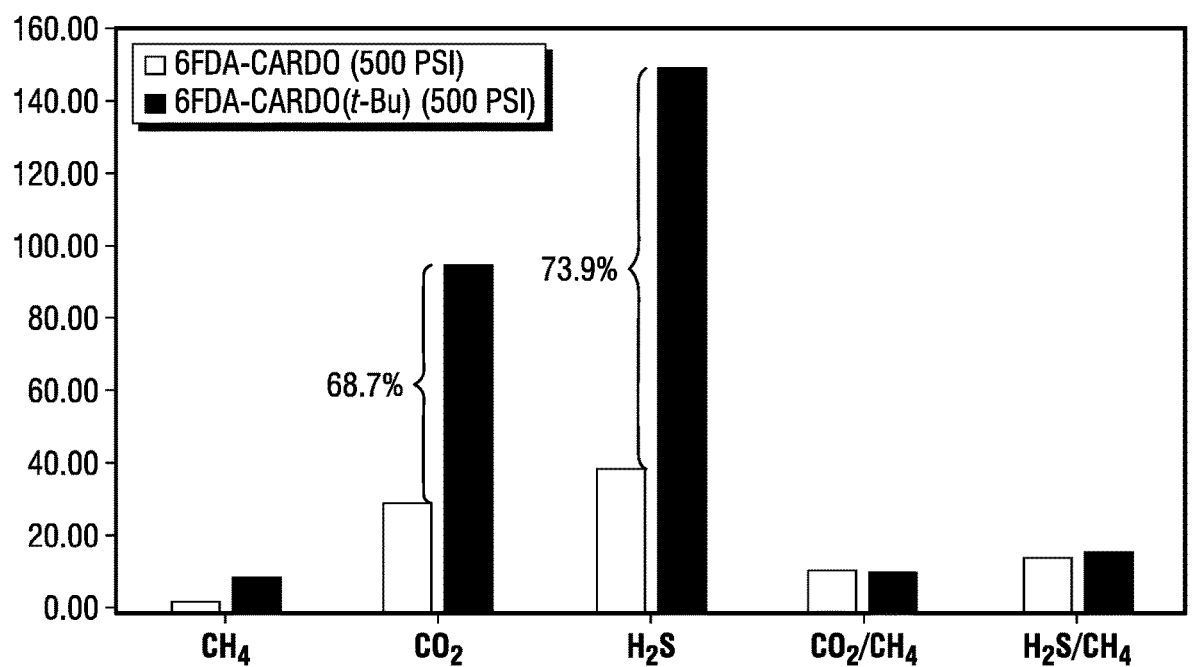
FIG. 19 is a column chart comparing the $CO_2/H_2S/CH_4$ sour mixed-gas permeability and selectivity coefficients of 6FDA-CARDO and 6FDA-CARDO(t-Bu) at 500 psi and 22° C.

The sour mixed gas permeation results show a clear improvement on the permeability coefficient when comparing the gas transport data of 6FDA-CARDO to that of 6FDA-CARDO(t-Bu), the $H_2S$ permeability coefficient, at 500 psi for example, increased from 38.77 Barrer to 148.49 Barrer (~73.9%, difference between modified value and original value divided by modified value) and the $CO_2$ permeability coefficient increased from 29.79 Barrer to 95.07 Barrer (~68.7%, difference between modified value and original value divided by modified value) accompanied by slightly changed $H_2S/CH_4$ (FIG. 19). The percent improvement for $CO_2$ permeability is therefore about 283% and the percent improvement for $H_2S$ permeability is about 219%.

FIG. 19 is a column chart comparing the $CO_2$, $H_2S$, and $CH_4$ sour mixed gas permeability and selectivity coefficients of 6FDA-CARDO and 6FDA-CARDO(t-Bu) at 500 psi and 22° C.

Surprisingly and unexpectedly, modification of polyimide polymer backbones by addition of bulky alkyl or acyl groups through Friedel-Crafts reactions significantly increases the permeability of, for example, $CO_2$ and $H_2S$, components in sour gas, without significantly increasing the permeability of $CH_4$ and without significantly impacting $CO_2$ and $H_2S$ selectivity with respect to $CH_4$. As previously discussed, thermal stability of the membranes is maintained. Therefore, such membranes can be advantageously used for sweet and sour gas separation of natural gas streams under aggressive conditions.

Embodiments of the present disclosure including aromatic random and block copolyimides provide superior efficiency, productivity, and resistance to penetrant-induced plasticization compared to CA, which is presently the industrial standard membrane material for $CO_2$ separations. Among the polymers for gas separation membranes, aromatic polyimides are one of the most attractive and promising materials due to their excellent properties such as high thermal stability, chemical resistance, and mechanical strength.

Both of these polymer properties can help a membrane structure made from polyimide to withstand deterioration due to the wet conditions often found with natural gas streams. The performance described previously for the developed materials is much higher than those obtained in certain current commercial membranes. Moreover, the $CO_2/CH_4$ and $H_2S/CH_4$ selectivities of the copolyimides do not degrade to anywhere near the same extent as was reported for CA and other commercial membranes, even under these much more aggressive environments.

Currently, limited data have been reported on the development of membrane materials for aggressive sour gas separations. Embodiments of the present disclosure have advantages over commercially available membranes as the aromatic copolyimides being disclosed here give better selectivity, permeability, and resistance to penetrant-induced plasticization compared to CA, which is the presently the industrial standard membrane material for $CO_2$ separations.

Therefore, disclosed are methods for producing a modified polyimide-containing compound with a bulky alkyl or acyl group, one method comprising the steps of: selecting and preparing a polyimide-containing compound to undergo a Friedel-Crafts alkylation or acylation reaction; carrying out the Friedel-Crafts alkylation or acylation reaction on the polyimide-containing compound to bond an alkyl group or acyl group to a reactive site on an aromatic compound of the polyimide-containing compound; cleaving the polyimide-containing compound to produce modified monomers comprising the alkyl group or the acyl group; and using the modified monomers in a reaction to produce the modified polyimide-containing compound, wherein the alkyl group or the acyl group is present in the modified polyimide-containing compound.

In some embodiments, the polyimide-containing compound comprises block copolymers. In other embodiments, the polyimide-containing compound comprises random copolymers. Still in other embodiments, the modified polyimide-containing compound comprises block copolymers. In certain embodiments, the modified polyimide-containing compound comprises random copolymers. In yet other embodiments, the methods include the step of formulating the polyimide-containing compound, where the step of formulating comprises combining more than one monomer in a mixture of monomers, where the more than one monomer is selected from the group consisting of: 2,2'-bis-(3,4-dicarboxyphenyl) hexafluoropropane dianhydride (6FDA); 9,9-bis(4-aminophenyl) fluorene (CARDO); 4,4'-(hexafluoroisopropylidene)dianiline (6FpDA); 4,4'-diaminotriphenylamine (TPA); 1,3-phenylenediamine (mPDA); durene diamine; 3,4,9,10-perylentetracarbonsäuredianhydrid (PTCDA); pyromellitic dianhydride (PMDA); 1,4-bis(4-aminophenoxy)triptycene (BAPT); 4,5,6,7-Tetrabromo-2-azabenzimidazole (TBB); 4,4'-(9-Fluorenylidene)dianiline (FDA); 4,4'-Oxydiphthalic anhydride (ODA); 2,2'-bis(trifluoromethyl)benzidine (ABL-21); 3,3'-dihydroxybenzidine; 3,3'-(hexafluoroisopropylidene)dianiline; 2,4,6-trimethyl-m-phenylenediamine (DAM); 4,4'-methyl ene-bis(2,6-diethylaniline) (MDEA); 9,9-bis(4-aminophenyl-3-isopropyl-5-methylphenyl) fluorene; 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; 2,3,5,6-Tetrafluoro-1,4-phenylenediamine; and benzophenone-3,3',4,4'-tetracarboxylic dianhydride (BTDA).

In some embodiments, the step of using the modified monomers in a reaction to produce the modified polyimide-containing compound comprises the step of combining the modified monomers with at least one monomer selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis (4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA.

Still in other embodiments, the step of cleaving the polyimide-containing compound comprises the use of hydrazine-containing compound, for example hydrazine hydrate. In some embodiments, the step of carrying out the Friedel-Crafts alkylation or acylation reaction on the polyimide-containing compound bonds a tert-butyl group to the aromatic compound. In yet other embodiments, methods include the step of preparing a membrane from the modified polyimide-containing compound. Still in other embodiments, the method includes the step of separating the components of a natural gas stream with the membrane. In certain embodiments, the natural gas stream pressure is no more than about 600 psig or 900 psig, and the $H_2S$ concentration is no more than about 20 volume percent or about 40 volume percent. Still other embodiments include the step of preparing a dense film from the modified polyimide-containing compound using a solution casting process.

In yet other embodiments, methods include the step of separating the components of a natural gas stream with the dense film. In certain embodiments, the natural gas stream pressure is no more than about 600 psig or 900 psig, and the H₂S concentration is no more than about 20 volume percent or about 40 volume percent.

Additionally disclosed is a membrane for separating the components of a sour natural gas feed, the membrane comprising: at least three distinct moieties polymerized together, the moieties including a first moiety comprising a bulky alky or acyl group; a second moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA; and a third moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA.

In some embodiments, the membrane comprises a 4,4'-(2,7-di-tert-butyl-9H-fluorene-9,9-diyl)dianiline (CARDO (t-Bu)) moiety. Still in other embodiments, the second moiety and third moiety are different compounds. In certain embodiments, the membrane comprises random copolymers. Still in other embodiments, the membrane comprises block copolymers. In yet other embodiments, the second moiety or third moiety comprise 6FDA. Additionally disclosed are methods for separating the components of a natural gas stream with the disclosed membranes, the method including separating one or more compounds from methane applying one or more of the membranes described herein under increased pressure greater than atmospheric pressure. In some embodiments, the natural gas stream pressure is no more than about 600 psig or about 900 psig, and the H₂S concentration is no more than about 20 volume percent or about 40 volume percent.

The singular forms "a," "an," and "the" include plural referents, unless the context clearly dictates otherwise. Where the term "about" is used, values and ranges includes plus and minus 5% of the given value or range.

In the drawings and specification, there have been disclosed embodiments of compositions, methods for production, and methods for use of modified polyimide polymers for sour gas feed separations from natural gas, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for producing a membrane for sour-gas separation comprising a modified polyimide-containing compound with an alkyl or acyl group, the method comprising the steps of:
   selecting and preparing a polyimide-containing compound to undergo a Friedel-Crafts alkylation or acylation reaction;
   carrying out the Friedel-Crafts alkylation or acylation reaction on the polyimide-containing compound to bond an alkyl group or acyl group to a reactive site on an aromatic compound of the polyimide-containing compound;
   cleaving the polyimide-containing compound to produce modified monomers comprising the alkyl group or the acyl group;
   using the modified monomers in a reaction to produce the modified polyimide-containing compound, wherein the alkyl group or the acyl group is present in the modified polyimide-containing compound; and
   producing a membrane comprising the modified polyimide-containing compound, the membrane operable for sour-gas separation.

2. The method according to claim 1, where the polyimide-containing compound comprises block copolymers.

3. The method according to claim 1, where the polyimide-containing compound comprises random copolymers.

4. The method according to claim 1, where the modified polyimide-containing compound comprises block copolymers.

5. The method according to claim 1, where the modified polyimide-containing compound comprises random copolymers.

6. The method according to claim 1, further comprising the step of formulating the polyimide-containing compound, where the step of formulating comprises combining more than one monomer in a mixture of monomers, where the more than one monomer is selected from the group consisting of: 2,2'-bis-(3,4-dicarboxyphenyl) hexafluoropropane dianhydride (6FDA); 9,9-bis(4-aminophenyl) fluorene (CARDO); 4,4'-(hexafluoroisopropylidene)dianiline (6FpDA); 4,4'-diaminotriphenylamine (TPA); 1,3-phenylenediamine (mPDA); durene diamine; 3,4,9,10-perylentetracarbonsauredianhydrid (PTCDA); pyromellitic dianhydride (PMDA); 1,4-bis(4-aminophenoxy)triptycene (BAPT); 4,5,6,7-Tetrabromo-2-azabenzimidazole (TBB); 4,4'-(9-Fluorenylidene)dianiline (FDA); 4,4'-Oxydiphthalic anhydride (ODA); 2,2'-bis(trifluoromethyl)benzidine (ABL-21); 3,3'-dihydroxybenzidine; 3,3'-(hexafluoroisopropylidene)dianiline; 2,4,6-trimethyl-m-phenylenediamine (DAM); 4,4'-methylene-bis(2,6-diethylaniline) (MDEA); 9,9-bis(4-aminophenyl-3-isopropyl-5-methylphenyl) fluorene; 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; 2,3,5,6-Tetrafluoro-1,4-phenylenediamine; and benzophenone-3,3', 4,4'-tetracarboxylic dianhydride (BTDA).

7. The method according to claim 1, wherein the step of using the modified monomers in a reaction to produce the modified polyimide-containing compound comprises the step of combining the modified monomers with at least one monomer selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA.

8. The method according to claim 1, where the step of cleaving the polyimide-containing compound comprises the use of hydrazine-containing compound.

9. The method according to claim 1, where the step of carrying out the Friedel-Crafts alkylation or acylation reaction on the polyimide-containing compound bonds a tert-butyl group to the aromatic compound.

10. The method according to claim 1, further comprising the step of preparing a membrane from the modified polyimide-containing compound.

11. The method according to claim 10, further comprising the step of separating the components of a natural gas stream with the membrane.

12. The method according to claim 11, where the natural gas stream pressure is no more than 600 psig and the $H_2S$ concentration is no more than 20 volume percent.

13. The method according to claim 1, further comprising the step of preparing a dense film from the modified polyimide-containing compound using a solution casting process.

14. The method according to claim 13, further comprising the step of separating the components of a natural gas stream with the dense film.

15. The method according to claim 14, where the natural gas stream pressure is no more than 600 psig and the $H_2S$ concentration is no more than 20 volume percent.

16. A membrane for separating the components of a sour natural gas feed, the membrane comprising:
    at least three distinct moieties polymerized together, the moieties including a first moiety comprising an alky or acyl group;
    a second moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA; and
    a third moiety selected from the group consisting of: 6FDA; CARDO; 6FpDA; TPA; mPDA; durene diamine; PTCDA; PMDA; BAPT; TBB; FDA; ODA; ABL-21; 3,3'-dihydroxybenzidine; 3,3'-(hexafluoroisopropylidene)dianiline; DAM; MDEA; 9,9-bis(4-aminophenyl-3-isopropyl-5-methylphenyl) fluorene; MDA; TFMB; 4,4'-Diaminooctafluorobiphenyl; 4,4'-Diaminobiphenyl; 2,3,5,6-Tetrafluoro-1,4-phenylenediamine; and BTDA;
    wherein one or more of the first moiety, the second moiety, or the third moiety is generated by carrying out the Friedel-Crafts alkylation or acylation reaction on the polyimide-containing compound to bond an alkyl group or acyl group to a reactive site on an aromatic compound of the polyimide-containing compound.

17. The membrane according to claim 16, where the membrane comprises a 4,4'-(2,7-di-tert-butyl-9H-fluorene-9,9-diyl)dianiline (CARDO(t-Bu)) moiety.

18. The membrane according to claim 16, where the second moiety and third moiety are different compounds.

19. The membrane according to claim 16, where the membrane comprises random copolymers.

20. The membrane according to claim 16, where the membrane comprises block copolymers.

21. The membrane according to claim 16, where the second moiety or third moiety comprise 6FDA.

22. A method for separating the components of a natural gas stream with the membrane of claim 16, the method comprising the step of:
    separating one or more compounds from methane applying the membrane of claim 16 under increased pressure greater than atmospheric pressure.

23. The method according to claim 22, where the natural gas stream pressure is no more than 600 psig and the $H_2S$ concentration is no more than 20 volume percent.

* * * * *